(12) United States Patent
Pottier et al.

(10) Patent No.: US 10,911,245 B2
(45) Date of Patent: Feb. 2, 2021

(54) METHOD OF ESTABLISHING TRUST BETWEEN A DEVICE AND AN APPARATUS

(71) Applicants: ARM IP Limited, Cambridge (GB); ARM LIMITED, Cambridge (GB)

(72) Inventors: Remy Pottier, Grenoble (FR); Amyas Edward Wykes Phillips, Cambridge (GB); Milosch Meriac, Cambridge (GB)

(73) Assignees: ARM IP Limited, Cambridge (GB); ARM Limited, Cambridge (GB)

( * ) Notice: Subject to any disclaimer, the term of this patent is extended or adjusted under 35 U.S.C. 154(b) by 114 days.

(21) Appl. No.: 15/549,505

(22) PCT Filed: Jan. 25, 2016

(86) PCT No.: PCT/GB2016/050148
§ 371 (c)(1),
(2) Date: Aug. 8, 2017

(87) PCT Pub. No.: WO2016/128713
PCT Pub. Date: Oct. 18, 2016

(65) Prior Publication Data
US 2018/0026799 A1 Jan. 25, 2018

(30) Foreign Application Priority Data
Feb. 9, 2015 (GB) .................................. 1502118.1

(51) Int. Cl.
*H04L 29/06* (2006.01)
*H04L 9/32* (2006.01)
(Continued)

(52) U.S. Cl.
CPC .............. *H04L 9/3263* (2013.01); *H04L 9/14* (2013.01); *H04L 9/30* (2013.01); *H04L 9/3226* (2013.01);
(Continued)

(58) Field of Classification Search
CPC . H04L 63/08; H04L 63/0823; H04L 63/0884; H04L 63/0876; H04L 63/10;
(Continued)

(56) References Cited

U.S. PATENT DOCUMENTS 6,691,232 B1 * 2/2004 Wood .................. H04L 63/0815
726/6
8,863,288 B1 * 10/2014 Savage ................. G06F 21/567
726/24

(Continued)

FOREIGN PATENT DOCUMENTS

CN 1545243 11/2004
CN 101176328 5/2008
(Continued)

OTHER PUBLICATIONS

Nick Anderson et al., Building a Chain of Trust: Using Policy and Practice to Enhance Trustworthy Clinical Data Discovery and Sharing, Dec. 2010, ACM, pp. 15-20. (Year: 2010).*
(Continued)

*Primary Examiner* — Luu T Pham
*Assistant Examiner* — Fahimeh Mohammadi
(74) *Attorney, Agent, or Firm* — Nixon & Vanderhye P.C.

(57) ABSTRACT

There is disclosed a method of establishing trust between an agent device and a verification apparatus, the method comprising: obtaining, at the agent device, a trust credential, wherein the trust credential relates to an aspect of the agent device and comprises authentication information for identifying at least one party trusted by the verification apparatus and/or device data relating to the agent device; transmitting, from the agent device to the verification apparatus, the trust credential; obtaining, at the verification apparatus, the trust credential; analysing, at the verification apparatus, the trust credential; determining, at the verification apparatus,
(Continued)

whether the agent device is trusted based on the analysis; and responsive to determining the agent device is trusted, establishing trust between the agent device and the verification apparatus.

14 Claims, 10 Drawing Sheets

(51) Int. Cl.
*H04L 9/14* (2006.01)
*H04L 9/30* (2006.01)

(52) U.S. Cl.
CPC .......... *H04L 9/3247* (2013.01); *H04L 9/3265* (2013.01); *H04L 9/3271* (2013.01); *H04L 63/0823* (2013.01)

(58) Field of Classification Search
CPC ... H04L 9/3265; H04L 9/3271; H04L 9/3263; H04L 9/30; H04L 9/3226; H04L 9/3247
See application file for complete search history.

(56) References Cited

U.S. PATENT DOCUMENTS

| | | | |
|---|---|---|---|
| 9,413,738 B2* | 8/2016 | Elien | H04L 67/20 |
| 2002/0147905 A1 | 10/2002 | Perlman | |
| 2004/0230799 A1* | 11/2004 | Davis | H04L 9/0662 |
| | | | 713/169 |
| 2006/0114839 A1 | 6/2006 | Meier et al. | |
| 2006/0242405 A1* | 10/2006 | Gupta | H04L 9/321 |
| | | | 713/156 |
| 2008/0307488 A1* | 12/2008 | Hammond, II | H04L 41/046 |
| | | | 726/1 |
| 2009/0070582 A1 | 3/2009 | Aura et al. | |
| 2009/0132813 A1* | 5/2009 | Schibuk | G06Q 20/322 |
| | | | 713/158 |
| 2009/0205028 A1* | 8/2009 | Smeets | H04W 12/0023 |
| | | | 726/6 |
| 2010/0042848 A1* | 2/2010 | Rosener | G06F 21/32 |
| | | | 713/184 |
| 2010/0095359 A1* | 4/2010 | Gordon | H04L 63/062 |
| | | | 726/6 |
| 2011/0040870 A1* | 2/2011 | Wynn | H04L 63/06 |
| | | | 709/224 |
| 2011/0246235 A1 | 10/2011 | Powell et al. | |
| 2012/0174198 A1 | 7/2012 | Gould et al. | |
| 2012/0331540 A1* | 12/2012 | Hoffman | H04L 9/3268 |
| | | | 726/10 |
| 2013/0212248 A1* | 8/2013 | Neafsey | H04L 63/08 |
| | | | 709/223 |
| 2013/0290735 A1* | 10/2013 | Rombouts | G06F 21/33 |
| | | | 713/189 |
| 2014/0013109 A1 | 1/2014 | Yin | |
| 2014/0137225 A1* | 5/2014 | Chickering | H04L 63/0807 |
| | | | 726/8 |
| 2015/0046997 A1* | 2/2015 | Gupta | H04L 63/0272 |
| | | | 726/7 |
| 2015/0263855 A1* | 9/2015 | Schulz | H04L 9/0827 |
| | | | 713/155 |

FOREIGN PATENT DOCUMENTS

| | | |
|---|---|---|
| CN | 104038932 | 9/2014 |
| WO | WO 2012/023122 | 2/2012 |
| WO | 2014/185990 | 11/2014 |

OTHER PUBLICATIONS

Adam Bates et al., Securing SSL Certificate Verification through Dynamic Linking, Nov. 2014, ACM, pp. 394-405. (Year: 2014).*
William Whyte et al., A Security Credential Management System for V2V Communications, Dec. 16-18, 2013, IEEE, pp. 108. (Year: 2013).*
Chad Brubaker et al., Using Frankencerts for Automated Adversarial Testing of Certificate Validation in SSL/TLS Implementations, May 18-21, 2014, IEEE, pp. 114-129. (Year: 2014).*
International Search Report and Written Opinion of the ISA for PCT/GB2016/050148, dated Mar. 22, 2016, 13 pages.
Search Report for GB 1502118.1, dated Jul. 24, 2015, 5 pages.
Search Report for GB 1502118.1, dated Oct. 14, 2015, 2 pages.
Anonymous, "Broadcast address—Wikipedia, the free encyclopedia", XP055257695, Aug. 1, 2014, pp. 1-3.
First Office Action for CN Application No. 201680009367.7 dated Apr. 23, 2020 and English translation, 31 pages.

* cited by examiner

METHOD OF ESTABLISHING TRUST BETWEEN A DEVICE AND AN APPARATUS

This application is the U.S. national phase of International Application No. PCT/GB2016/050148 filed 25 Jan. 2016, which designated the U.S. and claims priority to GB Patent Application No. 1502118.1 filed 9 Feb. 2015, the entire contents of each of which are hereby incorporated by reference.

The present technology relates to the field of data processing devices. More particularly, the technology relates to establishing trust between data processing devices and application providing apparatuses.

There are ever increasing numbers of data processing devices within the home, other buildings or the outdoor environment that have data processing and communication capabilities which allow them to interact with other data processing devices. Everyday objects having associated data processing devices may be connected to each other and to application providing apparatuses as part of the "Internet of Things" (IoT). For example, a sprinkler system in the home may gather information from various moisture sensors and control the activation of sprinklers based on the gathered information. Also, a healthcare provider may use wireless sensors (e.g. a heart rate monitor or a sensor for monitoring that a patient is taking their prescribed medicine) to track the health of patients while at home.

Hence, in a variety of applications, there may be one or more data processing devices that may provide data to one or more application providing apparatuses and/or are controlled by the application providing apparatuses.

The rapid and wide deployment of data processing devices and objects having associated data processing devices means there is a desire to make installation as simple and efficient as possible, and to allow for rapid scalability, whilst providing trusted data processing devices and objects.

For a better understanding of the embodiments and as to how the same may be carried into effect reference will now be made, by way of example only, to the accompanying figures in which:

FIG. 1 schematically shows an example of a system comprising a plurality of data processing devices in communication with application providing apparatuses and a remote resource according to an embodiment;

FIG. 2a schematically shows an example of a data processing device of the plurality of data processing devices of FIG. 1;

FIG. 2b schematically shows an example of an application providing apparatus of the application providing apparatuses of FIG. 1;

FIG. 3a schematically shows a system comprising a data processing device of FIG. 2a in communication with application providing apparatuses of FIG. 2b;

FIG. 3b schematically shows an example of a chain of certificates demonstrating a chain of trust;

FIG. 3c schematically shows the system of FIG. 3a according to a further embodiment;

Figure 5:
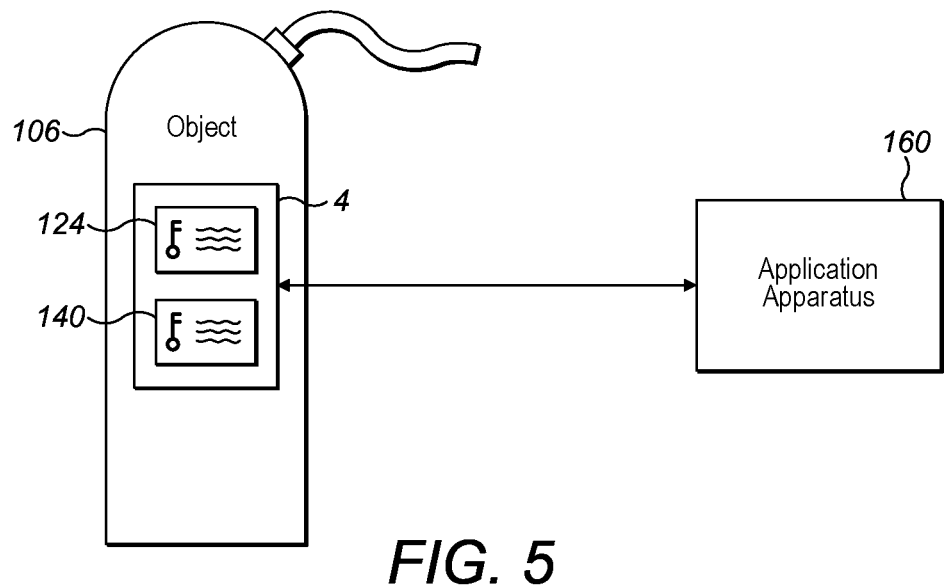
Figure 6:
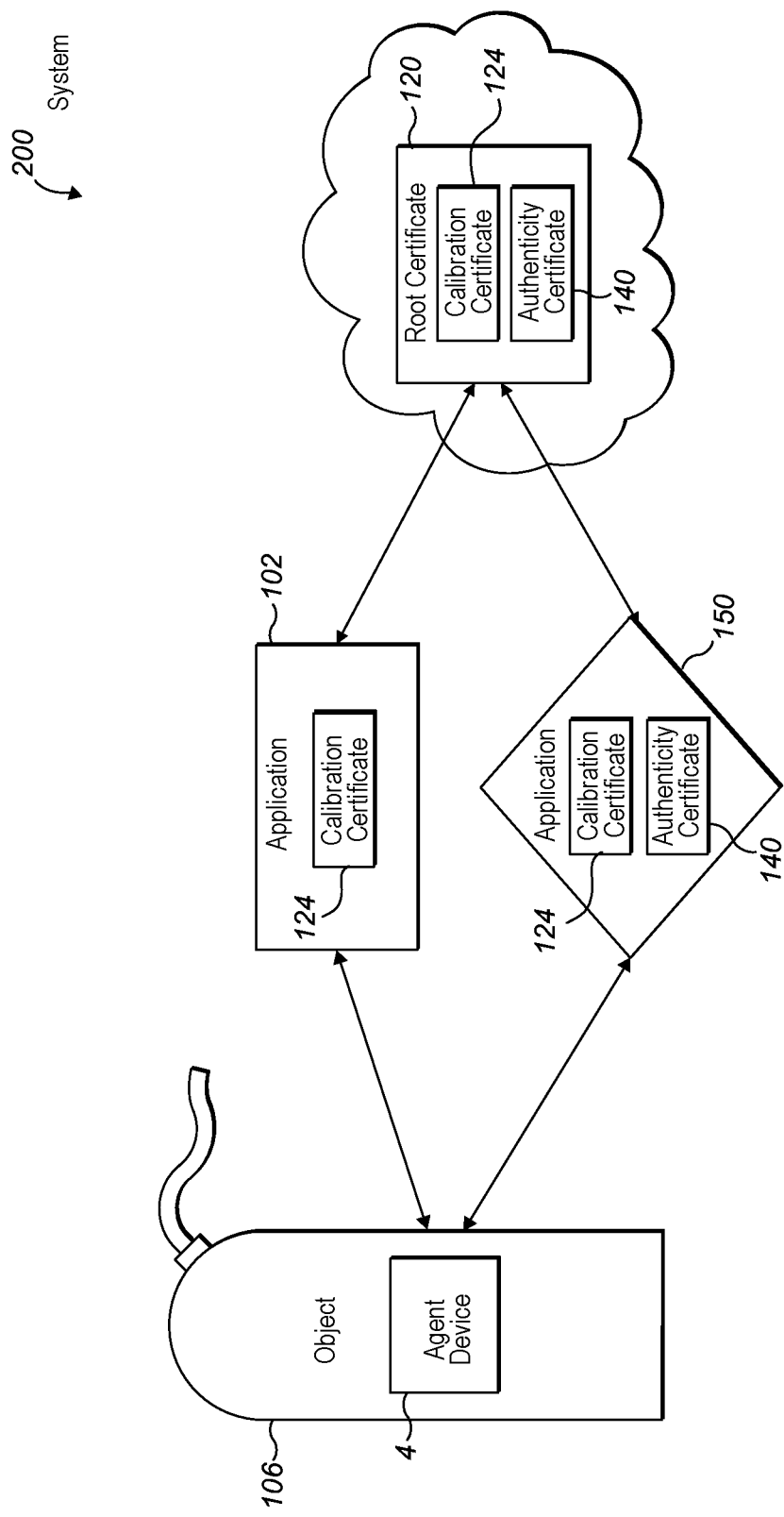
Figure 7A:
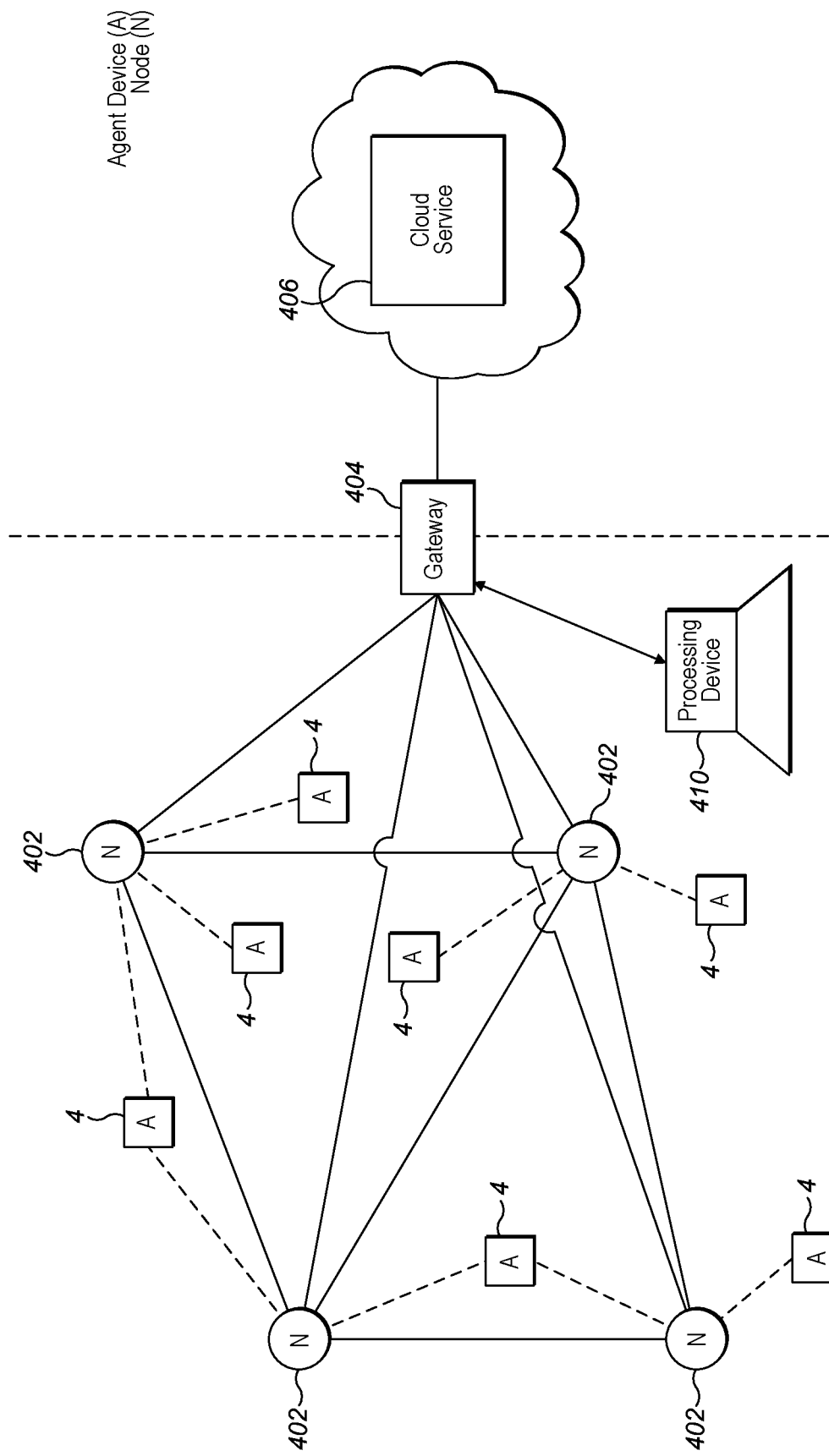
Figure 7B:
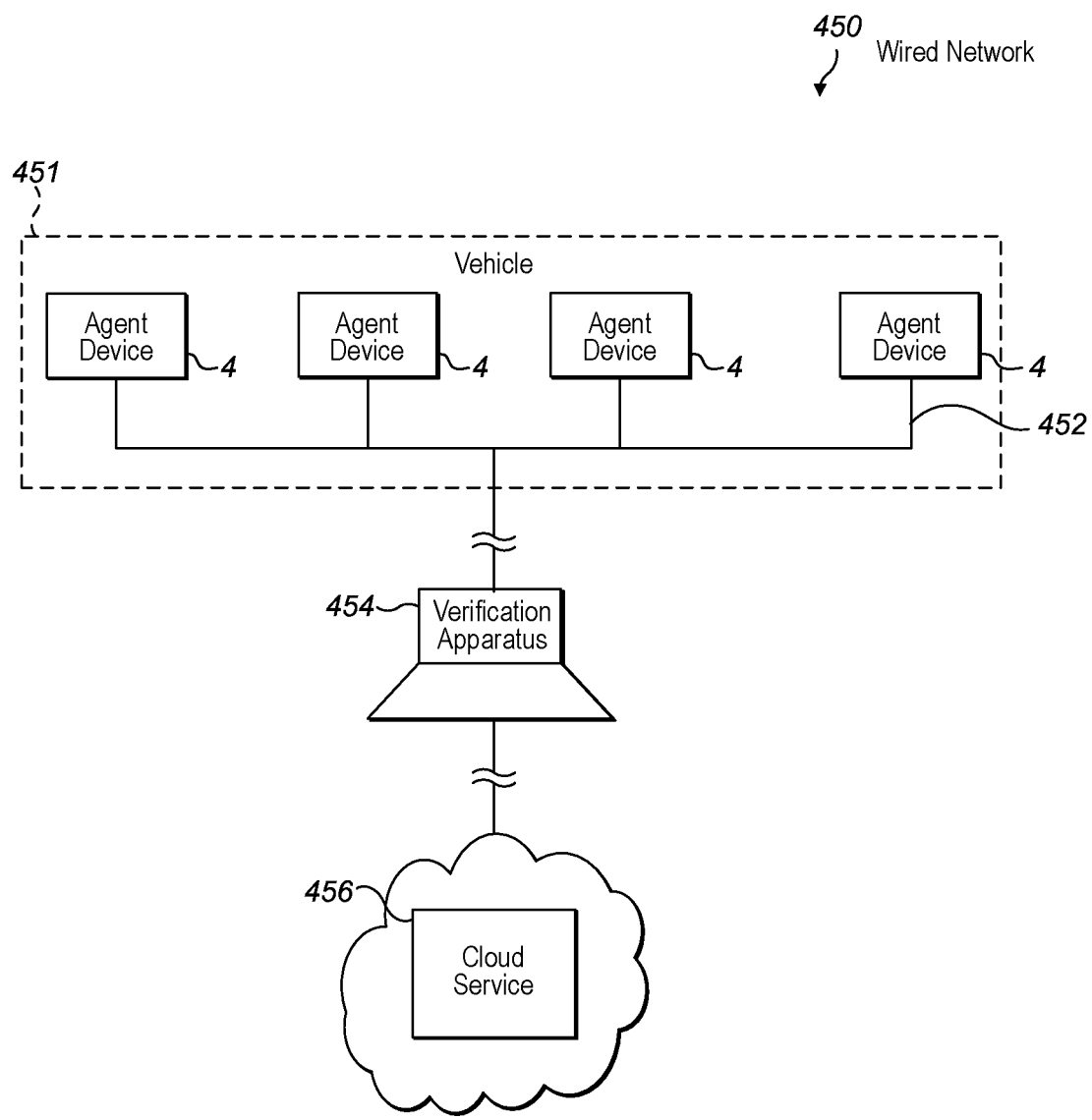

FIG. 5 schematically shows an example of a data processing device in communication with an application providing apparatus according to an embodiment;

FIG. 6 schematically shows a system comprising an agent device in communication with application providing apparatuses which are in communication with a remote resource according to an embodiment;

FIG. 7a schematically shows a system comprising a plurality of agent devices arranged in a mesh network; and FIG. 7b schematically shows a system comprising a plurality of agent devices arranged in a wired network.

Additional advantages and novel features will be set forth in part in the description which follows, and in part will become apparent to those skilled in the art upon examination of the following and the accompanying figures or may be learned by production or operation of the examples. The advantages of the present teachings may be realised and attained by practice or use of various aspects of the methodologies, instrumentalities and combinations set forth in the detailed examples discussed below.

In the following description numerous specific details are set forth by way of examples in order to provide a thorough understanding of the relevant teachings. However, it will be apparent to one of ordinary skill in the art that the present teachings may be practiced without these specific details.

In other instances, well known methods, procedures, components and/or circuitry have been described at a relatively high-level, without detail, in order to avoid unnecessarily obscuring aspects of the present teachings.

Figure 1:
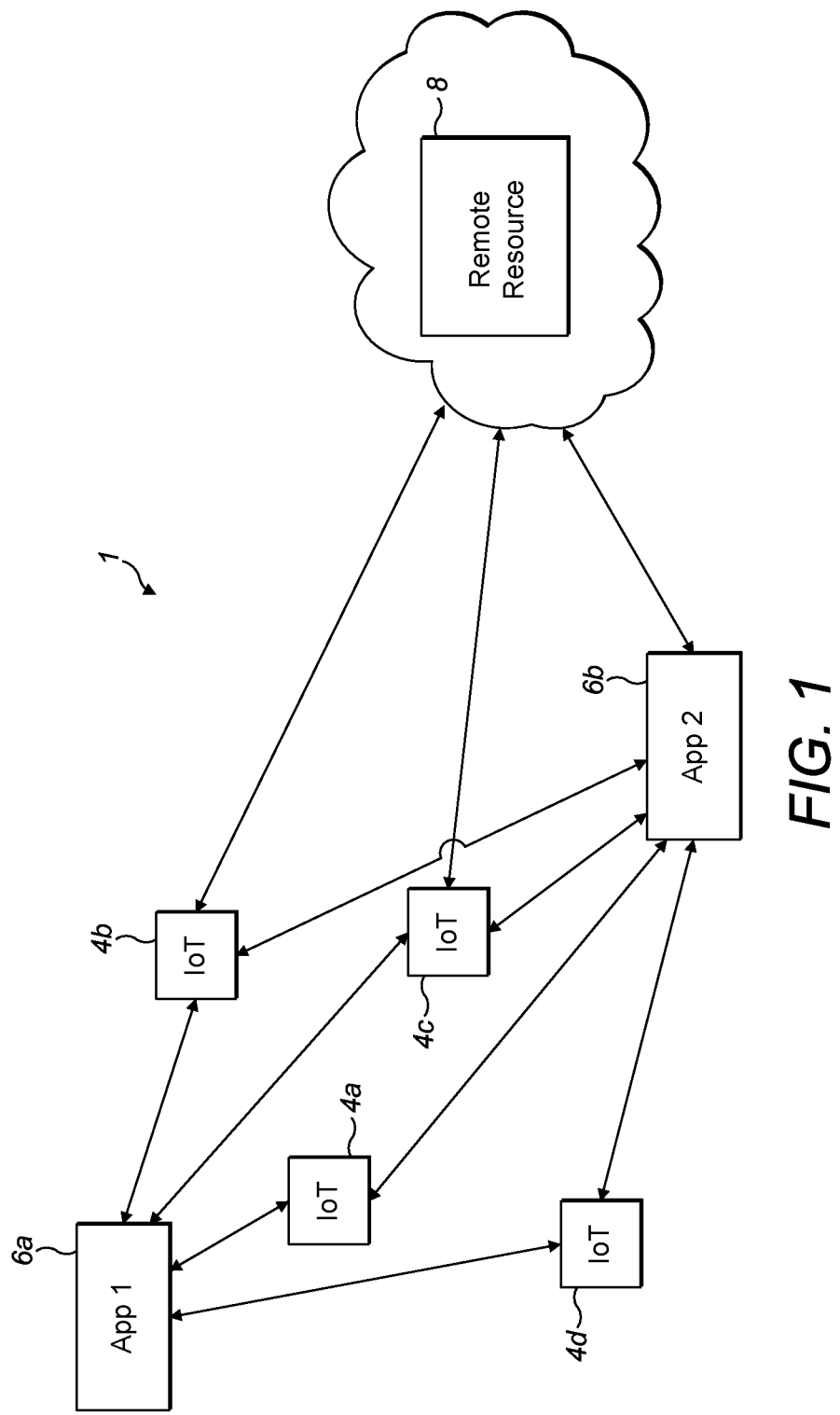

FIG. 1 shows an example of a system 1 comprising a number of data processing devices 4a-4d hereinafter "agent devices", application providing apparatuses 6a-6b, hereinafter "application apparatuses", and remote resource 8.

The agent devices 4a-4d may be any data processing devices which gather data for transmitting to an application apparatus and/or remote resource and/or which may be controlled by the application apparatus and/or remote resource.

For example, agent devices 4a-4d may be connected devices in a mesh network. Although the agent devices 4a-4d may comprise data processing devices such as a tablet computer or mobile telephone, often the agent devices 4a-4d may comprise relatively small scale data processing devices which perform only a limited set of tasks, such as sensors collecting sensing data and feeding the data back to an application apparatus, or a relatively simple control unit which controls or stores data relating to an associated object such as a door lock or air conditioning unit.

The agent devices 4a-4d may communicate with other devices (such as the application apparatuses 6 and/or remote resource 8) using wired or wireless communication.

The application apparatuses 6a-6b may comprise any device which provides a cloud service or executes an application program using data received from one or more agent devices 4a-4d and/or which may gather and/or generate data for transmitting to the agent devices 4a-4d (e.g. commands, credential data). For example, the application apparatuses may comprise nodes in the mesh network, which are in communication with a cloud service.

The remote resource 8 may comprise any hardware and/or software component(s) located/running on the cloud, for example a cloud server configured to receive data from agent devices 4a-4d, process and/or store the data and/or transmit the data to the application apparatuses 6a-6b, e.g. to provide a rich user experience to a user via a User Interface thereon.

Alternatively, the remote resource 8 may receive commands/data from the application apparatuses 6a-6b, and transmit the commands/data to the agent devices 4 e.g. on behalf of the application apparatuses 6a-6b.

The function of the agent devices 4a-4d, application apparatuses 6a-6b and/or remote resources 8 may vary considerably for different applications. For example, there may be applications in health and safety, home security, home or street lighting, utility provision, building automation, policing, asset tracking and logistics, etc.

Figure 2A:
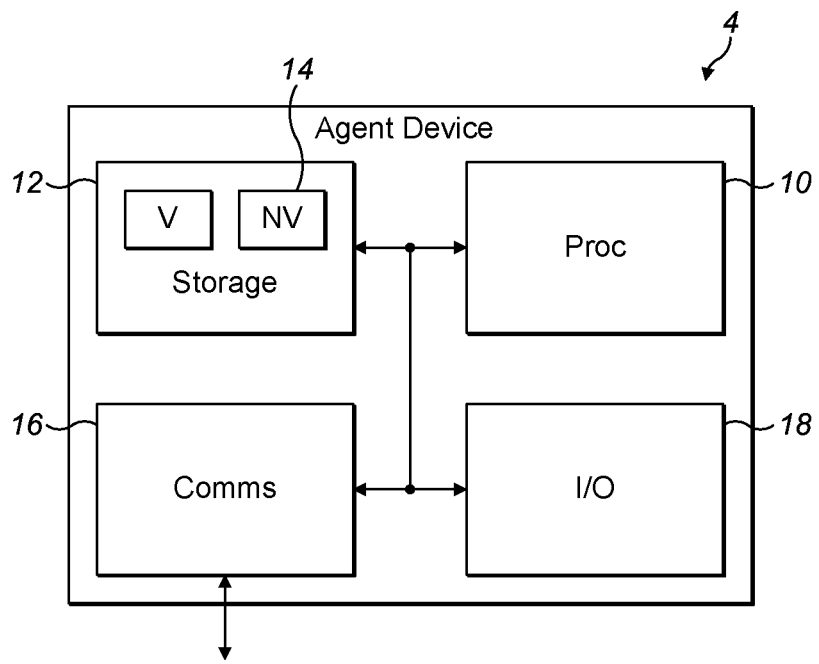

FIG. 2a schematically shows an example of circuitry used in an agent device 4 for use with the present techniques.

The circuitry illustrated in FIG. 2a includes processing element 10 coupled to a storage element 12, comprising, for example memory circuitry (volatile memory (V)/non-volatile memory (NV), such as, for example, flash and/or ROM). The memory circuitry may store programs, such as applications, executed by the processing element 10, as well as sensitive data and/or operational data.

In the present example, the (NV) memory region may be both read and written to, but for which read and write protection may be applied so that a protected region 14 can only be accessed by privileged software executed by the processing element 10.

The protected region 14 may, for example, store any sensitive data, such as, for example, credential data comprising, for example, verifiable trust credentials, hereinafter trust credentials, which may be used by the agent device 4 to demonstrate a level of trust to a $3^{rd}$ party, wherein the trust credential may relate to one or more different aspects of the device e.g. as to its identity its authenticity, its operating status, its maintenance status etc.

In some examples the trust credentials may comprise one or more digital certificate(s) e.g. X509 certificates.

The trust credentials may also include authentication information, which may be generated on the agent device 4, provisioned on the agent device 4, (e.g. at manufacture), or the authentication information may be transmitted to the agent device 4 from data processing devices/apparatuses/ resources remote therefrom.

In some examples, the authentication information may include cryptographic keys. Such cryptographic keys may be 128-bit or 256-bit AES (Advanced Encryption Standard) keys or elliptic curve cryptography (ECC) keys, and may be used for encryption or identification verification purposes e.g. using digital signatures.

As an illustrative example, a cryptographic key pair may be generated by the processing element 10 whereby one cryptographic key (e.g. a private key) may be stored in the protected region 14 whilst a corresponding key (e.g. a public key) may be transmitted to a data processing device/application apparatus remote therefrom. When the agent device signs data/communications/certificates using the private key, a data processing device/application apparatus having access to the corresponding public key can confirm that the agent device has access to the private key by authenticating the signature using the corresponding public key. It will be appreciated that private keys should not be distributed to $3^{rd}$ parties, and therefore, the data processing device/application apparatus may recognise the agent device as being the only device having access to the particular private key, thereby confirming the identity of the agent device as the device having access to the particular private key.

The agent device 4 also comprises communication circuitry 16 for communicating with other data processing devices/apparatuses/resources remote therefrom. The communication circuitry 16 may use wireless communication, such as, for example, wireless local area network (e.g. WiFi), short range communication such as radio frequency communication (RFID), near field communication (NFC) and/or communications used in wireless sensor networks such as ZigBee, Bluetooth and/or Bluetooth Low energy (BLE). Also the communication circuitry 16 may use a cellular network such as 3G or 4G. The communication circuitry 16 may also use wired communication such a fibre optic or metal cable. The communication circuitry 16 could also use two or more different forms of communication, such as several of the examples given above in combination.

The agent device 4 may also comprise input/output (I/O) circuitry 18 e.g. a user interface (UI), such as a display for communicating messages to a user and/or, in the case of touch display or an input button, to allow the user to interact with the agent device 4.

The I/O circuitry 18 may also comprise sensing circuitry to sense inputs from the surrounding environment, whereby, for example, the agent device 4 may generate operational data based on the sensed inputs which the agent device is configured to sense.

In some examples, the agent device 4 may be calibrated and/or undergo maintenance (which may include repair) in order to ensure that the agent device 4 functions correctly and as expected, and generates accurate and reliable operational data.

For example, the agent device 4 may comprise a temperature sensor, which generates operational data based on sensing the temperature of the surrounding environment and pushes the operational data to an application apparatus or remote resource. The operational data may then be processed at the application apparatus, and the results displayed to an interested party e.g. via a UI on the application apparatus which may be a wearable apparatus such as a watch. The temperature sensor may be calibrated e.g. by an authorised technician to ensure that the operational data is accurate.

In a further example, the agent device 4 may comprise a fitness band which generates operational data relating to movement of a user, for example capturing distance walked/ run/swam by a user, or elevation ascended/descended by a user, which is subsequently pushed to a remote resource for access by the user via an application apparatus. The fitness band may be calibrated e.g. by a vendor at a time of purchase/or maintenance to ensure that the fitness band will operate as expected e.g. capture distance accurately.

In a further example, the agent device 4 may comprise an embedded sensor as part of physical objects.

For example, the agent device 4 may comprise an embedded entry sensor in a smart-door, which is operable to lock/unlock the smart-door based on communications comprising authentication information received from a user. The entry sensor may be calibrated to ensure that the entry sensor will operate as expected e.g. lock/unlock the door in accordance with authentication information presented thereto.

In a further example, the agent device 4 may be provided as an embedded sensor within a fire extinguisher having a fire retardant substance therein, whereby, for example, the embedded sensor measures the chemical formulation, level of and/or pressure of the fire retardant substance within the fire extinguisher, and generates operational data based on the sensed measurements, and pushes (directly or via a remote resource) the sensed measurements to a central application apparatus for monitoring the state of the fire extinguisher. The embedded sensor and the extinguisher may both be calibrated e.g. by an authorised maintenance technician, for example every 6 months, in order to ensure the embedded sensor and the fire extinguisher will operate as expected when required.

The agent device 4 may be provided with one or more physical labels for establishing trust between the agent device and a verifying party inspecting the physical label, when the present techniques are not used.

For example, in order to demonstrate that calibration/maintenance was undertaken correctly and to a particular standard, a party undertaking the calibration and/or maintenance of the agent device 4 and/or an associated object may apply a physical label to the agent device 4/associated object which may list when the calibration/maintenance was completed, by whom, and whether that party was authorised, and which may be signed with a signature of the party undertaking calibration/maintenance.

Alternatively, a manufacturer may apply a physical label to an agent device/associated object to demonstrate that the agent device/associated object is authentic.

For example, the physical label may also comprise a hologram e.g. having the logo of a recognised manufacturer that manufactured the agent device/associated object.

Furthermore, the agent device 4/associated object may also comprise further labels applied by other parties during the lifecycle of the device to demonstrate trust to a $3^{rd}$ party e.g. by another calibration party for a different calibration period, by a vendor of the device, by an Original Equipment Manufacturer (OEM).

However, such labels and holograms may be readily replicated and, for example, placed on non-authentic or cloned devices which are sold on the grey market. Furthermore, scalability and traceability of agent devices may become increasingly difficult when using many physical labels.

Furthermore, as well as applying a physical label, data relating to the agent device 4/associated object may be recorded within a physical paper file and maintained as a record for the data. For example, when undertaking calibration/maintenance, a party may perform tests on the device and record any measured data in a physical record, whereby such records may be stored e.g. within a dedicated storage facility.

According to an embodiment, the agent device 4 may be configured to demonstrate trust to a verifying party using trust credentials. As above, the trust credentials may include authentication information for identifying a party trusted by the verifying party, and the trust credentials may further include device data relating to the agent device. As such trust may be established between the agent device and the verifying party by analysis of the trust credentials and the authentication information and/or device data included in the trust credentials.

It will be appreciated that trust between parties may be established by any suitable means. As an illustrative example, a party (Party A) may be a trusted party to a verifying party (Party B) because Party A has a well-known reputation or because the two parties have a relationship/are familiar with each other e.g. a business relationship.

As a further illustrative example, intermediate parties Party X and Party Y may be trusted by Party B, because, although Parties X and Y are unknown to, or do not have a relationship with, Party B, Party X is able to demonstrate to Party Y that it is trusted by Party A, whilst Party Y can demonstrate to Party B that it is trusted by Party X, and can further demonstrate that Party X is trusted by party A.

Therefore, in the present illustrative example, a chain of trust exists between parties A, B, X and Y whereby in the case above, Party A is a root authority, whilst Parties X and Y are intermediate authorities and Party B is a verifying party.

It will be appreciated that any number of intermediate authorities may exist in a chain of trust, whereby the chain of trust can lead back to the root authority, or to an intermediate party if trusted by B.

As an illustrative example, and looking again at FIG. 1, a technician may be authorised to undertake calibration or maintenance of agent devices 4a-4d on behalf of an owner of agent devices.

After calibration and/or maintenance of an agent device, the technician may, on an application apparatus 6a associated therewith, generate trust credentials whereby, in the present example, the trust credentials comprise authentication information relating to the identity of any parties involved in calibration (e.g. the agent device being calibrated and the party undertaking the calibration and/or other parties as discussed below).

The technician may further generate device data, which may, for example comprise data relating to the operating parameters measured during calibration (e.g. voltage levels, power efficiency) and/or data relating to the operating state of the agent device at calibration (e.g. current software version, any identified faults or errors), data relating to the precision of the agent device at calibration (e.g. any adjustments/offsets undertaken to meet manufacturer's specifications), and/or data relating to any calibration and/or maintenance procedures undertaken by the technician in relation to the agent device (e.g. a summary of the procedures undertake, a result of the procedures (e.g. calibration passed/failed, expiry date of calibration etc.)). The device data may be included within the trust credentials to form part thereof.

As above, the trust credentials may comprise authentication information identifying the technician and the agent device(s) being calibrated. In some examples, the authentication information may provide a chain of trust between the agent device, intermediate parties and a root authority (e.g. the agent device, the application apparatus, the technician's employer, a certification authority).

After generating the trust credentials for the respective agent devices 4a-4d, the technician may, using the application apparatus 6a, transmit the trust credentials to the respective agent devices 4a-4d, which may be stored in memory circuitry thereon, such as within the protected NV region.

The agent devices 4a-4d may then broadcast the trust credentials, or transmit the trust credentials on request, to a party (e.g. to an application apparatus associated with the verifying party) that is interested in determining whether or not an agent device can be trusted hereinafter "verifying party", for verification of the trust credentials as required, and for the analysis of any device data therein. An application running on an application apparatus associated with the verifying party may process the trust credentials when received thereby to analyse and verify the trust credentials.

Using such functionality, the agent devices 4a-4d may then use their respective trust credentials to establish trust between the agent device and the verifying party e.g. in the present example, to demonstrate to a verifying party that the agent devices were calibrated by a technician trusted by a specific root authority which may be trusted by the verifying party, whereby the verifying party may also analyse any device data in the trust credential. As above, if the root authority is trusted by the verifying party, then the verifying party may trust the technician, and therefore, the agent device.

Furthermore, the verifying party may analyse the device data included in the trust credentials to determine, for example, whether or not the agent devices are calibrated to correct standards, whether or not the agent device has passed calibration and/or whether or not the agent device has any identified faults. Based on the analysis of the trust credential, the verifying party may establish that the agent device can be trusted.

In a further illustrative example, the agent devices 4a-4d may be provisioned with trust credentials to demonstrate the authenticity of the respective agent devices 4a-4d. For example, the agent devices 4a-4d may be provisioned with trust credentials comprising certificates and may include authentication information identifying the agent device and the manufacturer thereof, to demonstrate to a verifying party that the agent device was manufactured by a manufacturer trusted by the verifying party.

As above, the authentication information may provide a chain of trust between the agent device, intermediate parties and a root authority (e.g. the agent device, the vendor and/or manufacturer).

Furthermore, and as above, the trust credentials may include device data, whereby the device data may be recorded during manufacture of the agent device, and may comprise, for example, data relating to the manufacturing process (e.g. date of manufacture, batch number, location of manufacture), data relating to operating parameters of the device measured during manufacture (e.g. voltage levels, power efficiency, offsets), data relating to the operating state of the device at manufacture, data relating to the precision of the device at manufacture, and/or data relating to any procedures undertaken by the manufacturer in relation to the agent device (e.g. Installed software version 1.0).

A verifying party may then analyse the trust credentials to establish trust between the device and a verifying party e.g. in the present example, to determine that the agent devices were manufactured by the stated manufacturer.

Such functionality may increase an application provider's confidence in the source of operational data obtained from agent devices, e.g. when undertaking "big data" applications, which process large amounts of data received from many sources (e.g. from hundreds/thousands/millions of agent devices).

It will be appreciated that the value of information gathered for "big data" applications may depend on the accuracy and validity of the data received from individual agent devices (i.e. "little data"), and, as such, an application provider will want to establish trust with all agent devices which provide little data for a big data application.

If an application provider cannot trust an agent device and the operational data generated by the untrusted agent device (e.g. the precision/accuracy thereof), then any conclusions generated by the "big data" application also may also not be trusted, rendering the entire application pointless, thereby resulting in wasted resources e.g. time, energy, costs etc.

As an illustrative example, thousands of agent devices may be located around the globe, whereby each agent device is configured to generate meteorological data which is pushed to a remote resource (e.g. a database server located on the cloud). The data pushed to the remote resource from the individual agent devices may be considered little data.

An application apparatus which runs a weather application may pull all the little data from the remote resource for processing as part of a big data application to perform forecasting and identify trends in weather patterns based on the little data. However, it will be appreciated that if the little data is not trusted or is inaccurate, then any forecasts or trends identified may not be relied upon.

Therefore, using the present techniques on establishing trust between an agent device and a verifying party, the verifying party may then trust any operational data generated by the trusted agent device e.g. the accuracy, precision and validity thereof.

The specific trust credentials required by a particular agent device to establish trust between the agent device and a verifying party may be dependent on the requirements of the verifying party, but, as above, may relate to different aspects of the agent device, such as: authenticity (e.g. that the device is authentic, for example whereby it is manufactured/sold by an legitimate source, that the operating parameters of the device are within a specific tolerance), maintenance (e.g. that the device has been maintained by an authorized party, that specific maintenance procedures were undertaken) and/or calibration (e.g. that the device has been calibrated by a trusted party, that the device has passed a calibration procedure; that the operating parameters of the device are within a specific tolerance). It will be appreciated that the examples are not limited to the above referenced specific trust credential nor are the trust credentials limited to the aspects described above.

Furthermore a verifying party may require verification of a plurality of valid trust credentials before trust is established between the verifying party and the agent device.

Figure 2B:
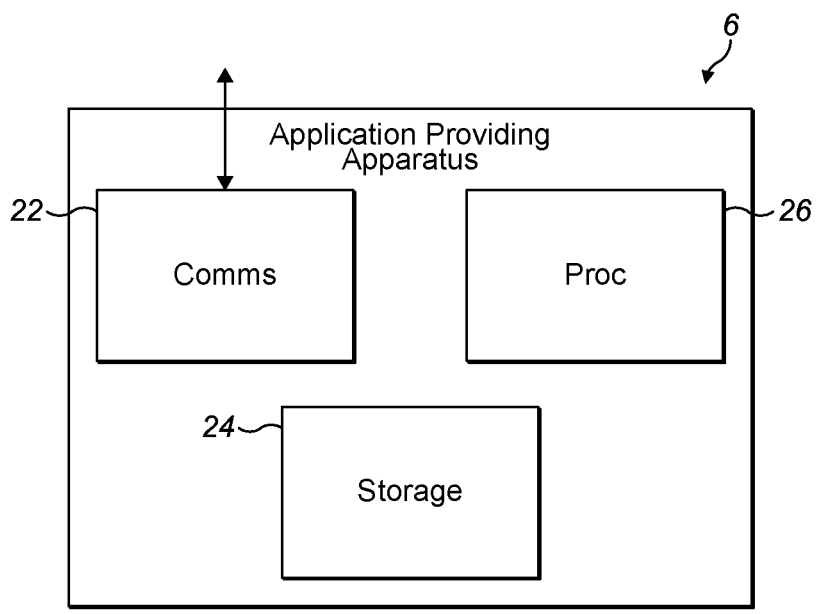

FIG. 2b shows an example of an application apparatus 6, which may be used to generate and/or to verify trust credentials.

Communications circuitry 22 is provided for communicating with the agent devices 4 and or remote resource (not shown). Again, different forms of wired or wireless communication may be provided as discussed above for the agent device 4. The application apparatus 6 also comprises storage element 24, for example, memory circuitry as above, for storing various data and applications used by the application apparatus 6. For example the storage element 24 may store an application program which uses data (e.g. operational data/trust credentials) received by the communication circuitry 40 from the agent devices 4 and processes it in some way, or which issues control commands to the agent device 4. Furthermore the storage element 24 may also store sensitive data such as trust credentials.

Processing circuitry 26 is provided for executing the applications and controlling other operations, generating credentials and/or verifying credentials (e.g. trust credentials).

Cryptographic features may be provided, such as secure memory in the storage element 24 and crypto algorithms or secure processing functionality in the processing circuitry 26. The application apparatus may also comprise I/O circuitry for receiving inputs from a user or a device, and for generating messages e.g. on a screen on the apparatus.

The application apparatus 6 may take any suitable form and may for example include laboratory equipment (e.g. an oscilloscope), personal computing equipment (e.g. laptop computer, tablet), a smartphone, a wearable device (e.g. a watch). In other examples, the application apparatus may comprise a cloud component (e.g. a server configured to run applications thereon).

Figure 3A:
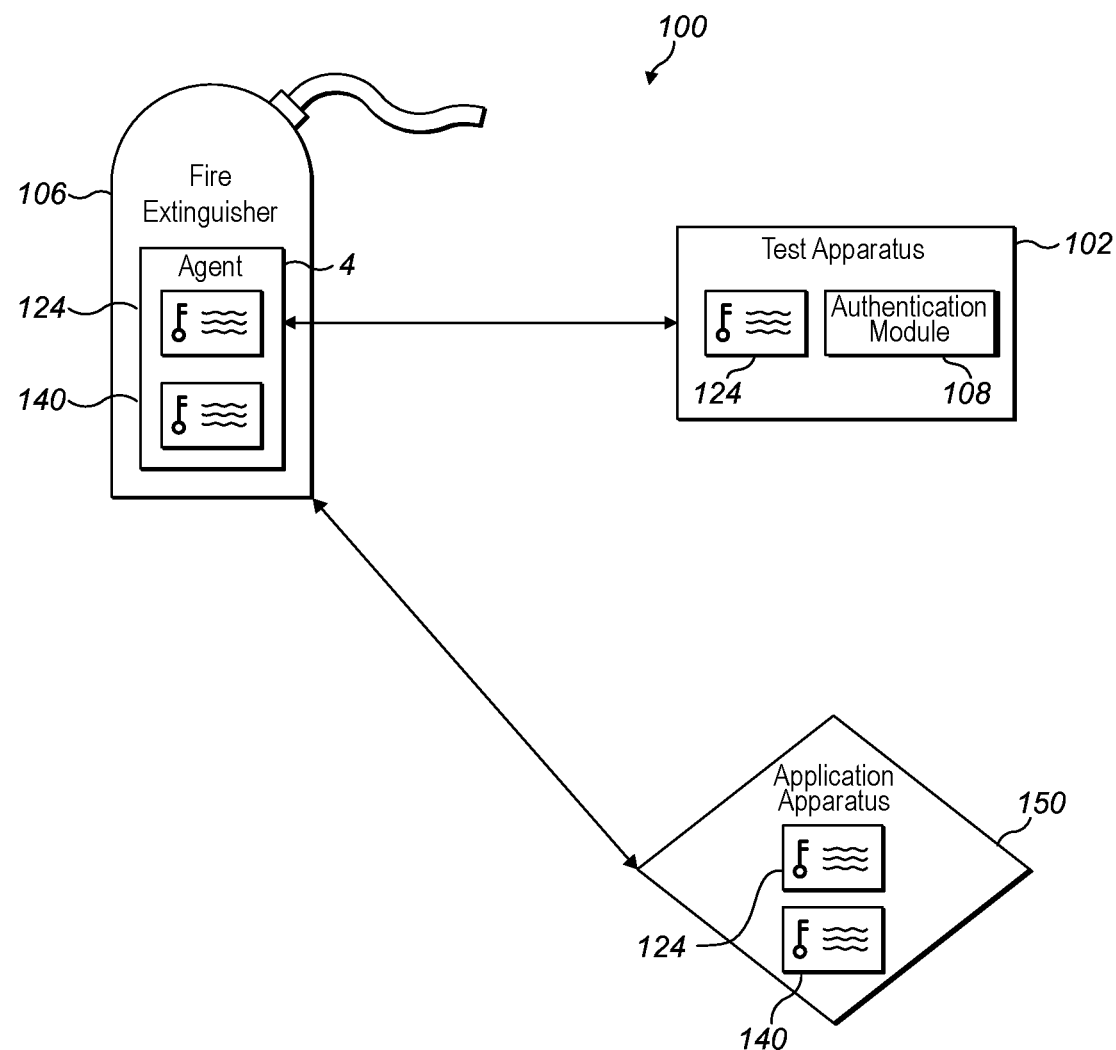

FIG. 3a schematically shows a system 100 comprising application apparatus 102 and application apparatus 150 in communication (e.g. via BLE) with agent device 4.

In the present example, the agent device 4 comprises an embedded sensor which is provided as part of a physical object 106. In the present illustrative example, the physical object 106 is depicted as hardware equipment in the form of a fire extinguisher, whilst the agent device 4 is configured to generate operational data based on sensed inputs relating to the fire extinguisher, such as, for example, the level of fire retardant substance within the fire extinguisher, the internal pressure of the extinguisher and/or the temperature of the surrounding environment.

As above, it will be appreciated that the agent device 4 is not limited to being an embedded sensor, nor is the agent device 4 limited to being part of hardware equipment, but is described as such for illustrative purposes.

The fire extinguisher 106 and/or the agent device 4 may require periodic calibration and/or maintenance (e.g. on a bi-annual basis (every 6 months)), for example to meet health and safety requirements of an owner.

Upon calibrating the fire extinguisher/agent device, a party, which in the present example is a technician, may generate a trust credential 124 relating to the calibration process using an application apparatus 102 associated therewith, hereinafter "test apparatus" 102.

In the present example, the trust credential generated by the calibration technician is illustratively shown to comprise a digital certificate relating to the calibration history of the device, hereinafter "calibration certificate" 124.

As above, the calibration certificate comprises authentication information identifying the test apparatus 102, which in the present example may comprise a cryptographic key or a signature using a cryptographic key, which can be used to verify that the test apparatus generated the calibration certificate 124. For example, the calibration certificate may be signed by a private key ($Prk_{(Test)}$) of the test apparatus 102.

Furthermore, the calibration certificate 124 may include authentication information identifying the agent device to which the calibration certificate relates. For example, the authentication information identifying the agent device may comprise the public key of the agent device ($Puk_{(Agent)}$), which may be signed using the private key of the test apparatus ($Prk_{(Test)}$).

The test apparatus 102 may then transmit the calibration certificate 124 to the agent device 4 for storage thereon. As such, the calibration certificate 124 on the agent device 4 provides for verification and traceability of the calibration operation back to the test apparatus 102, whereby the signature on the calibration certificate 124 can be verified using the corresponding public key $Puk_{(Test)}$, to verify that the calibration certificate 124 originated from the test apparatus 102.

In some examples, the test apparatus 102 may further comprise an authentication module 108, which is operable to receive a verifiable input from a user of the apparatus (e.g. the technician) and verify the identity of that user based on the verifiable input.

For example, the authentication module 108 may comprise a fingerprint scanner which is operable to scan a fingerprint of the technician and verify the identity of the technician. It will be appreciated that the authentication module 108 may, additionally or alternatively, comprise radio frequency identification (RFID) circuitry, near field communication (NFC) circuitry, an input port (e.g. a Universal Serial Bus (USB) port), and/or a keypad to receive the verifiable input from the technician e.g. via an identification tag or software dongle (e.g. USB stick) belonging to the technician, a username and password combination entered by the user and/or using an electronic signature (e-signature), for examples using a qualified electronic signature card.

Details relating to the verification of the technician's identity may be included within the calibration certificate 124 as authentication information to identify the technician (e.g. the verifiable input, time of verification; GPS coordinates, input data etc.).

Therefore, if a specific technician calibrates the device, the identity of that technician may be included within the calibration certificate 124 to improve traceability of the parties involved in the calibration.

As above, the calibration certificate 124 may also include device data, whereby, in some examples, the technician may input data relating to the calibration procedure on the test apparatus 102 e.g. via touch input provided thereon. Additionally or alternatively, the test apparatus 102 may be used to perform tests on the agent device 4 (e.g. via wired/wireless communication) and to automatically generate and record any test measurements, and to include the results of the test measurements in the calibration certificate 124 as device data.

Therefore, in the present example, the calibration certificate 124 may comprise device data comprising, for example:
- the time and date of the calibration (e.g. 10:00; 12 Dec. 2014);
- an indication as to whether or not the agent device passed calibration (e.g. "Pass" or "Fail");
- date of expiry of the calibration period (e.g. 12 Jun. 2015);
- measured values recorded during a calibration procedure (e.g. Peak voltage=5.2V; Peak Power=2W);
- measured precision of the device in comparison to manufacturers recommended values (e.g. +0.00009 Psi; −98 ml, +0.004V);
- any identified faults during the calibration procedure (e.g. level sensor failure);

The calibration certificate 124 may also include further data such as:
- a device identifier of the device being calibrated (e.g. an IPv6 address, IPv4 address or an alphanumeric identifier e.g. "Fire_ExtinguisherX"); and/or
- authentication information identifying the parties involved in the calibration (e.g. the agent device, the technician, the test apparatus).

As above, the authentication information of the calibration certificate 124 may provide a chain of trust back to a root authority, whereby any number of intermediate parties/authorities may be identified in the chain of trust.

In the present illustrative example, the technician may be authorised to undertake calibration of the fire extinguishers using his test apparatus supplied by his employer, who, in turn, may be authorised to undertake calibration of fire extinguishers by a root authority, for example a Fire Standards Institute (FSI), whereby the FSI may be a Certified Authority (CA1), which is recognised (e.g. by the UK government/UK companies) as being a trusted root authority for calibration certificates.

Figure 3B:
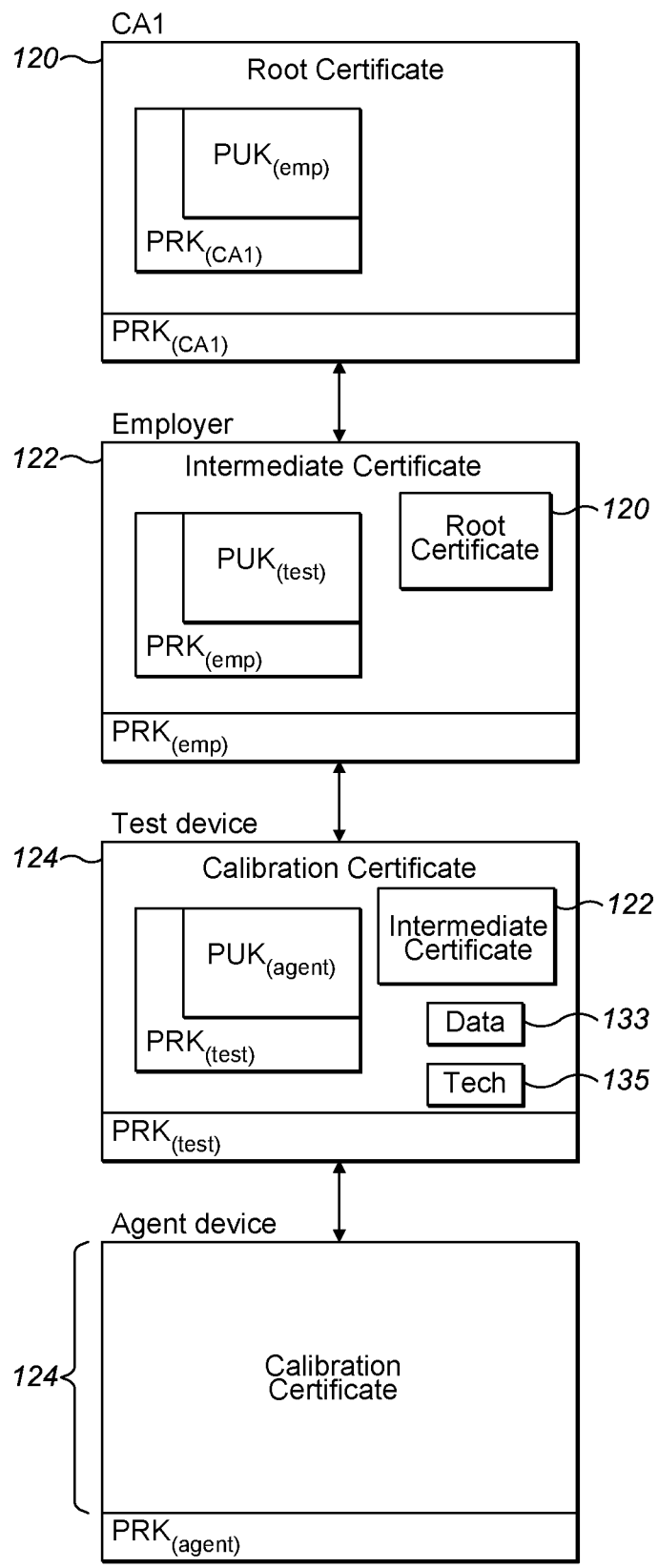

As an illustrative example of such functionality, a chain of certificates 129 having CA1 as a root authority, and having a number of intermediate authorities is shown in FIG. 3b, whereby CA1 authorises the employer to issue certificates on CA1's behalf. In the present example, a public key of the employer ($Puk_{(EMP)}$) is signed with the private key of CA1 ($Prk_{(CA1)}$) and included in a root certificate 120 issued by CA1. The root certificate 120 may be signed using the private key of CA1 ($Prk_{(CA1)}$), and issued to the employer (e.g. on an application apparatus associated therewith).

Furthermore, the employer may generate an intermediate certificate 122 for the test apparatus 102, by signing a public key of the test apparatus $Puk_{(Test)}$ with the employer's private key $Prk_{(EMP)}$ and including the signed key in intermediate certificate 122. The employer may sign the intermediate certificate 122 with the employers private key $Prk_{(EMP)}$, and transmit the intermediate certificate 122 to the test apparatus, whereby the intermediate certificate 122 may also comprise the root certificate 120.

Furthermore, the test apparatus 102 may generate the calibration certificate 124 to be sent to the agent device 4, by signing a public key of the agent device $Puk_{(Agent)}$ with the test apparatus' private key $Prk_{(Test)}$ and including the signed key in calibration certificate 124. The test apparatus 102 may then sign the calibration certificate 124 with its private key $Prk_{(Test)}$, and transmit the calibration certificate 124 to the agent device 4, whereby the calibration certificate 124 may also comprise the intermediate certificate 122, which, in turn, may comprise the root certificate 120. The test apparatus may further generate device data, and include the device data within the calibration certificate 124 e.g. within a text field 133. As above, the device data may include: the time and date of the calibration; an indication as to whether or not the agent device passed calibration; date of expiry of the calibration period; measured values recorded during a calibration procedure; measured precision of the device in comparison to manufacturers recommend values; any identified faults during the calibration procedure.

The test apparatus 102 may automatically generate the calibration certificate 124 e.g. on receiving an input command from the technician that the calibration procedure is complete e.g. via a touch screen associated therewith.

In some examples, the test apparatus 102 may require a positive identification of the technician before generating the certificate (e.g. via fingerprint scanner, software dongle, e-signature etc.), whereby identification details of the technician can be included in the calibration certificate as authentication information identifying the technician. Such details may be included within a text field 135 in the calibration certificate 124.

The test apparatus 102 may then transmit the calibration certificate 124 to the agent device 4 (e.g. over BLE), whereby the agent device 4 may automatically store the calibration certificate 124 in memory circuitry thereon.

Using such functionality, the technician can readily generate calibration certificates comprising authentication information and device data for agent devices, and transmit the calibration certificates to the agent devices using a test apparatus. It will be appreciated that such functionality greatly reduces the paper-trail required to be generated by the technician, as all device data may be included within the digital certificate, whilst the digital certificate may provide secure traceability to all parties involved in the calibration process.

Furthermore, it will be appreciated that digital certificates may be continually transmitted to the agent device over the lifetime of the agent device 4, whereby for examples, older digital certificates stored in memory circuitry on the agent device 4 may be overwritten by newer certificates comprising updated device data/authentication information etc.

Furthermore, the digital certificates may allow for a party to generate a certificate and chain back to a previous certificate in order to freeze the state at the time of generating the certificate.

Optionally, the agent device 4 may verify the identity of the test apparatus which transmitted the calibration certificate 124 thereto e.g. by verifying the authentication information within the calibration certificate 124 e.g. using a public key(s) corresponding to the private key(s) in the calibration certificate 124 (or the certificate chain), whereby any public keys may be provisioned on the agent device e.g. at manufacture or within the transmitted certificates.

Using such functionality, the agent device 4 may store the calibration certificate 124 within memory circuitry thereon only after a positive verification of the calibration certificate 124.

In some examples, if the calibration certificate 124 is not verified by the agent device, e.g. if the signature of the CA1, or one of the intermediate authorities, is not verified, the agent device 4 may discard/ignore the calibration certificate 124. Such functionality may ensure that the storage available on the device is only made available for verified certificates, whereby unverified certificates will not be stored.

When the agent device 4 transmits the calibration certificate 124 to another device, the agent device 4 may sign the calibration certificate with its private key $Prk_{(Agent)}$.

Therefore, it will be appreciated that the calibration certificate 124, signed by the agent device 4 may provide a chain of trust from the agent device 4 leading back to a root authority, which in the present illustrative example is CA1, and, as such, trust may be established between the agent device 4 and a verifying party that trusts CA1, or which may trust one of the intermediate authorities.

Additionally or alternatively, a further trust credential such as a time dependent identifier may be generated and applied to the calibration certificate 124 at the test apparatus 102 before transmission to the agent device 4, to demonstrate when the certificate was generated i.e. freshness thereof. Such time dependent identifiers may include timestamps generated using the RFC 3161 protocol, or an ascii (American Standard Code for Information Interchange) date.

A valid time dependent identifier may further establish trust between the agent device 4 transmitting the certificate and the verifying party. For example, a verifying party may require the presence of a valid time dependent identifier within a valid chain of certificates before trusting an agent device 4.

Time dependent identifiers may also be added to all the certificates 120, 122 in the chain to further enable the establishment of trust between the agent device 4 and the verifying party.

It will be appreciated that each of the certificates in the chain of certificates 129 may include an expiry date, which may define a duration for which a particular certificate 120, 122, 124 is valid.

For example, the root certificate 120 issued by CA1 to the employer may be valid for 1 year, whereby the employer may receive/request an updated certificate from CA1 when that period expires.

The intermediate certificate 122 issued by the employer to the test apparatus 102 may be valid for a week, after which point a technician may, using the test apparatus, request an updated certificate from the employer (although the test apparatus may generate a request automatically on behalf of a technician). Using such functionality, if a technician's employment is terminated, he will not be capable of generating a valid calibration certificate 124 with the certificate 122 from his employer after the expiry date on the certificate 122.

Furthermore, the test apparatus 102 may generate a calibration certificate 124 comprising an expiry date which expires at the end of the calibration period.

Figure 3C:
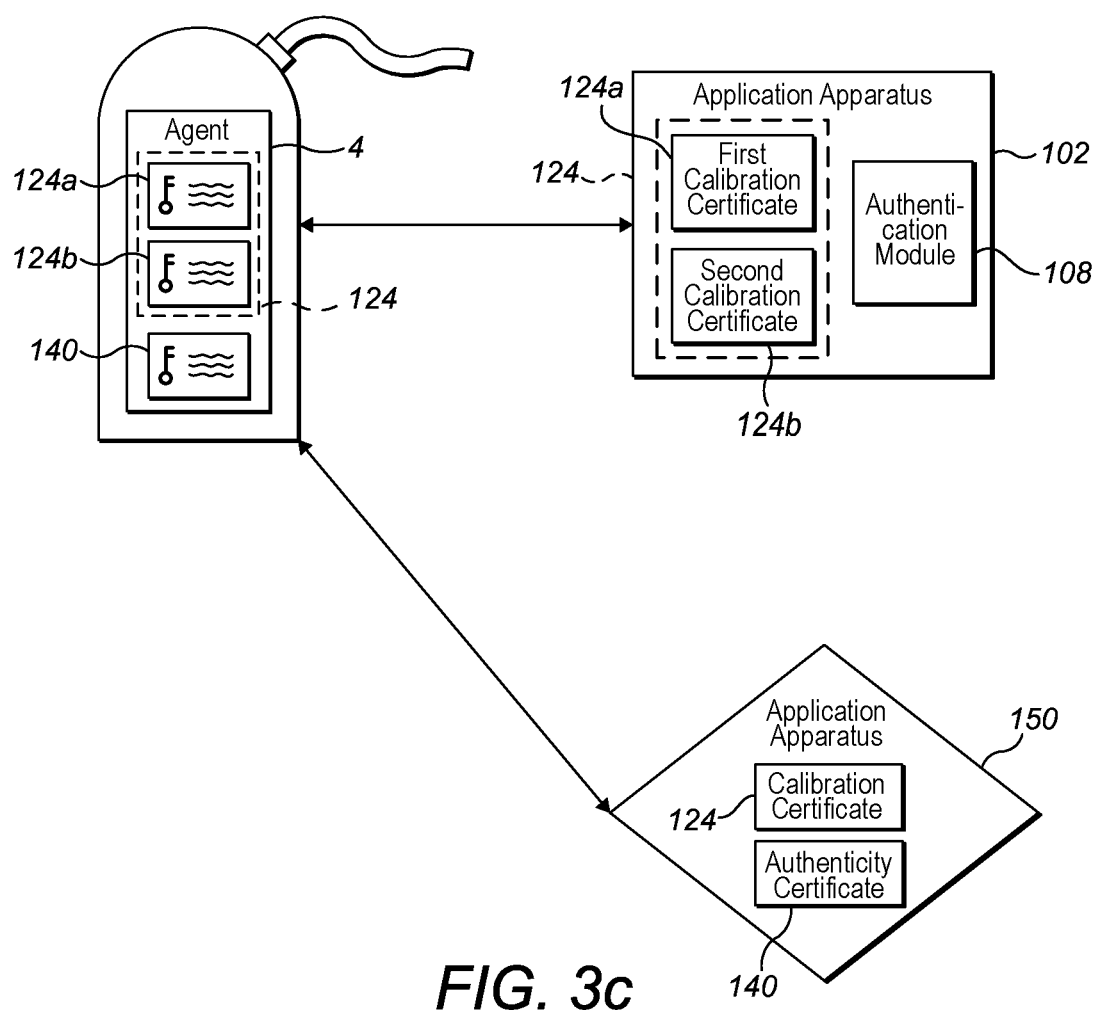

As illustratively shown in FIG. 3c, in some examples, the technician may generate a number of different trust credentials relating to the same aspect of an agent device (e.g. calibration, maintenance, authenticity), whereby the different trust credentials may comprise different device data and/or different authentication information. Using such functionality it may be possible to provide summary trust credentials and detailed trust credentials relating to the same aspect of an agent device.

For example, a first calibration certificate 124a may comprise device data specifying whether the agent device passed or failed calibration, and may include the date of expiry of the calibration period, whilst a second calibration certificate 124b may comprise more detailed device data such as for example, for example, whether the agent device passed or failed calibration, the date of expiry of the calibration period, the measured precision of the device and/or any identified faults.

In a further illustrative example, the first calibration certificate 124a may provide a chain of trust leading back to a first root authority, whilst the second calibration certificate may provide a chain of trust leading back to second root authority. Using such functionality, different root authorities may be provided for the same aspect of an agent device.

As further illustratively shown in FIGS. 3a and 3c, a further example of a trust credential on the agent device is illustratively described as a digital certificate relating to the authenticity of the agent device 4, hereinafter "authenticity certificate" 140.

As above, the authenticity certificate 140 may provide a chain of trust e.g. from the agent device 4 to a recognised root authority, which in the present example is certified authority (CA2), which may, for example, be the manufacturer of the agent device 4.

In the present example, an intermediate authority "VendorZ" may be a vendor authorised to sell the fire extinguisher 106 on behalf of a further intermediate authority OEM "OEMX", whereby OEMX, in turn, may be authorised, by the manufacturer of agent device 4 (CA2), to use the agent device 4 in the fire extinguisher 106.

Therefore, it will be appreciated that the authenticity certificate 140, comprising certificates from VendorZ, OEMX and CA2, may provide a chain of trust leading back to CA2.

A verifying party may then, using an application apparatus associated therewith, communicate with the agent device to request credential data from the agent device 4, and, on receiving the authenticity certificate 140, to verify the authenticity certificate 140. As such, trust may be established between the application apparatus and the agent device if the application apparatus trusts a party in the chain e.g. CA2.

Such functionally is illustratively shown in FIGS. 3a and 3c, whereby a verifying party, depicted as a fire extinguisher inspector in the present examples, may, using an application apparatus 150 associated therewith, hereinafter "verification apparatus", verify the trust credentials on the agent device 4.

The fire extinguisher inspector may, using the verification apparatus 150, broadcast a scanning communication comprising a request for agent devices to respond by transmitting any credential data thereon (e.g. trust credentials) to the verification apparatus 150.

It will be appreciated that the agent device 4 may transmit the trust credentials e.g. the calibration and/or authenticity certificates 124/140 to the verification apparatus 150 as requested. However, the agent device may confirm that the scan request is received from an authorised source.

For example, the scan request may comprise a trust credential of a party trusted by the agent device. In some examples, the scan request may comprise further trust credentials, such as a verifiable time dependent identifier e.g. a timestamp/ascii date. Provision of the verifiable time dependent identifier within the request may provide security against replaying attacks. Such scanning may be undertaken, for example, using a Bloom filter.

For example, the scan request may comprise a communication (e.g. a cryptographic nonce) comprising authentication information identifying a root authority trusted by the agent device e.g. whereby the communication is signed with a private key of the root authority. An agent device receiving the scan request may verify the scan request, e.g. by verifying the signature used to sign the communication, for example, using a corresponding public key provided thereon (e.g. provisioned thereon at manufacture/or by the owner), and by further verifying a time dependent identifier if present, for example, by checking that the date/time on the time dependent identifier is within an acceptable timeframe. The timeframe may be defined e.g. by an owner, and set in memory circuitry on the agent device.

In further examples, the scan request may comprise authentication information identifying the verification apparatus 150 e.g. whereby the request may be signed using a private key associated with the verification apparatus ($Prk_{(Ver)}$), whereby only agent devices having the corresponding public key ($Puk_{(Ver)}$) provisioned thereon may respond to the request on verifying the signature. The public key ($Puk_{(Ver)}$) may be provisioned on the agent device e.g. at manufacture or periodically by the owner.

The verification apparatus 150 may then analyse the trust credentials to verify whether the received trust credentials are valid, for example, in the case of a calibration certificate 124, to verify the chain of trust. The verification apparatus 150 may also be used to analyse any device data within the calibration certificate 124, e.g. to verify whether the agent device passed/failed the calibration process, that the calibration period has not expired and/or whether any offsets set during calibration are within an acceptable tolerance range of the inspector. Trust may then be established between the agent device and the verification apparatus based on the analysis.

Therefore, it will be appreciated that trust credentials can be used to establish trust between the verifying party and the agent device.

In the example described in FIG. 3c, the verification apparatus may request a summary trust credential and/or a detailed trust credential. For example, the inspector may only be interested in whether the agent device passed its calibration procedure, and if it's within the calibration period.

Furthermore, in the case of an authenticity certificate 140, the verification apparatus 150 may verify the agent device's 4 authenticity by checking whether the chain of certificates leads back to a device manufacturer trusted by the verification apparatus. As such a valid authenticity certificate can establish trust between the verifying party and the agent device.

As above the verification apparatus 150 may require verification of a plurality of valid trust credentials before trust is established between the verification apparatus and the agent device. For example, as shown in systems of FIG. 3a or 3c, if the authenticity certificate 140 is valid, but the calibration certificate 124 is invalid, then the verification apparatus may determine that the agent device is not to be trusted. However, in alternative examples, the validity of the authenticity certificate 140 may be sufficient to establish trust between the agent device and the verification apparatus.

After inspection is complete the inspector, may demonstrate that he has undertaken a inspection. For example, the fire extinguisher inspector, may, using the verification apparatus 150, generate a trust credential e.g. an inspection status certificate (not shown), comprising for example, the identity of the fire extinguisher inspector, the date of the inspection, result of the inspection and may also include authentication information identifying a chain of trust from the agent device 4 being inspected to a root authority, e.g. a fire inspection standards board (FSB).

The fire inspection certificate may be transmitted from the verification apparatus 150 to the agent device 4 for storage in memory circuitry thereon, and for subsequent verification by a further verifying party.

It will also be appreciated that, whilst not illustratively shown in FIG. 3a or 3c, other application apparatuses (such as the test apparatus 102) and/or remote resources (not shown) may also request trust credentials from agent devices in order to verify whether or not the device can be trusted.

In some examples, in order to further verify that that the agent device 4 transmitting the certificates is actually the agent device that it claims to be, the verification apparatus 150 may undertake a challenge-response procedure with the agent device to determine whether the agent device has access to a particular private key ($Prk_{(Agent)}$). The challenge-response procedure may be undertaken on receiving trust credentials from the agent device. Any suitable-challenge response procedure may be undertaken.

As an illustrative example of a challenge-response procedure, the verification apparatus 150 may generate a cryptographic nonce and transmit the nonce to the agent device 4. On receiving the nonce the agent device 4 may sign the nonce with the private key $Prk_{(Agent)}$ corresponding to the public key $Puk_{(Agent)}$ provisioned on the verification apparatus 150, and transmit the signed nonce to the verification apparatus 150. The verification apparatus 150 may then verify the signature on the signed nonce using the public key $Puk_{(Agent)}$ provisioned thereon.

The public key $Puk_{(Agent)}$ associated with the agent device 4 may be provisioned on the verification apparatus 150 (e.g. during a registration procedure with a cloud service and/or the agent device).

As above, it will be appreciated that cryptographic private keys of public/private key pairs are generally only accessible by one party (e.g. agent device) and, as such, by demonstrating that it has access to the private key $Prk_{(Agent)}$, the agent device can demonstrate its identity to a party having the corresponding public key $Puk_{(Agent)}$.

Therefore, a challenge-response procedure enables the verification apparatus 150 to confirm that the agent device 4 has access to the private key $Prk_{(Agent)}$ and therefore, to verify the identity of the agent device 4.

Such functionality prevents rogue devices (e.g. cloned devices), having a cloned valid certificate chain(s) provided thereon, duping a verification apparatus into trusting the rogue devices because, although the rogue devices may be capable of presenting a valid certificate chain to the verification apparatus, the rogue devices will not have the corresponding private key thereon, and therefore will not be capable of undertaking a challenge-response procedure to prove device identity.

Figures 4A, 4B:
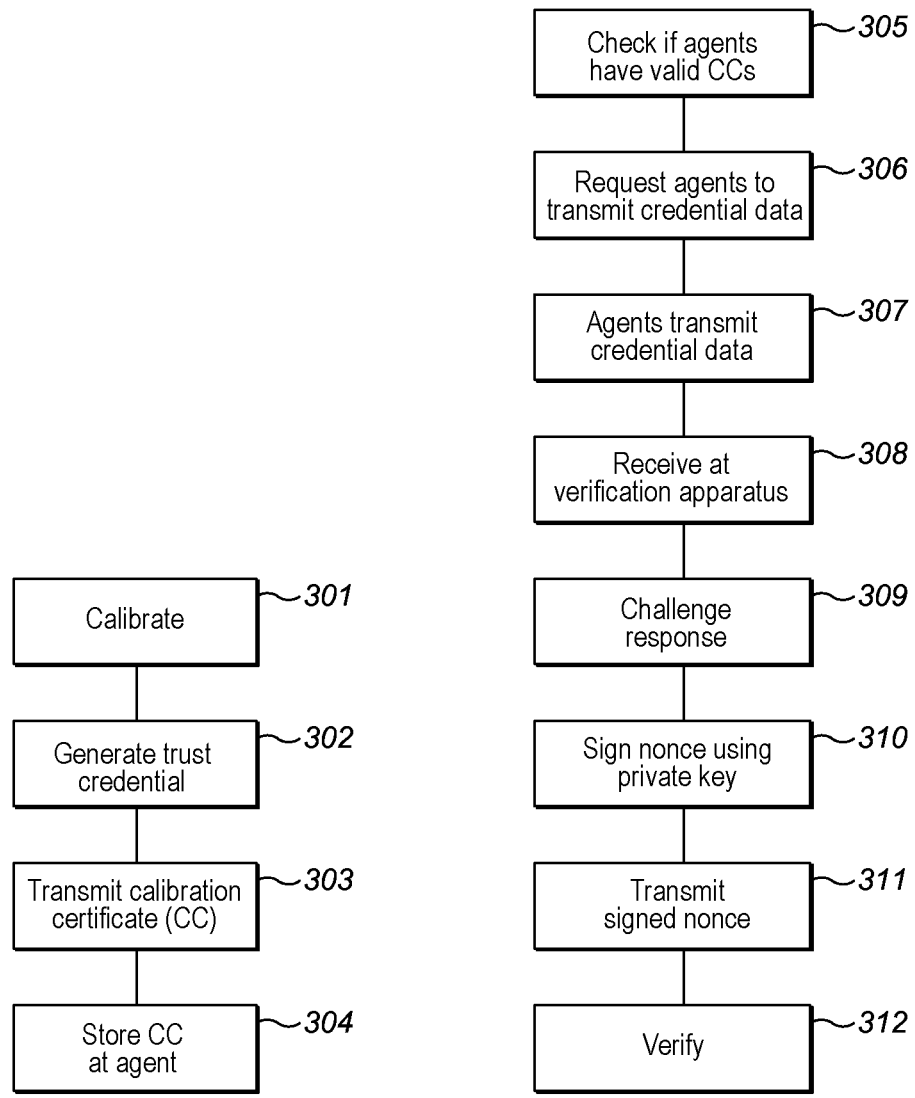
FIG. 4a is a flow diagram schematically showing an example of a party providing trust credentials on a data processing device according to an embodiment.
FIG. 4b is a flow diagram schematically showing an example of a verifying party checking the trust credentials of FIG. 4a according to an embodiment.

FIG. 4a is a flow diagram showing an example of the calibration technician generating trust credentials on a test apparatus and transmitting them to an agent device, whilst FIG. 4b is a flow diagram showing an example of a verifying party, which in the present example is a fire extinguisher inspector, verifying the trust credentials of the agent device 4.

At step 301, as above, the calibrating technician undertakes a calibration procedure on the agent device.

At step 302, the calibrating technician causes the test apparatus to generate a trust credential, which in the present example is a calibration certificate. As above, the calibration certificate may comprise device data, and may further comprise authentication information providing a chain of trust from the agent device to a root authority. Furthermore, as above, the technician may generate two or more calibration certificates, whereby the different calibration certificates may comprise different device data/authentication information.

For example, a first calibration certificate may comprise a summary calibration certificate having device data solely indicating whether or not the agent device passed/failed the calibration procedure, whilst a second calibration certificate may comprise a more detailed calibration certificate having device data which may include the measured values recorded during a calibration procedure, measured precision of the device, an indication that the device passed/failed the calibration procedure and/or the expiry date of the calibration period.

At step 303, the calibration certificate(s) is transmitted to the agent device e.g. via BLE, whereby the calibration certificate(s) may be signed by the test apparatus before transmission, whilst at Step 304, the calibration certificate(s) is stored in memory circuitry at the agent device. It will be appreciated that such functionality may be used to generate and transmit trust credentials for a plurality of individual agent devices.

At Step 305, an inspector may wish to verify the trust credentials of all agent devices within an area e.g. to check if all agent devices within that area comprise valid calibration certificates, and at Step 306 the inspector may, using the associated verification apparatus, broadcast (e.g. via BLE) a request for the agent devices to transmit their respective credential data e.g. trust credentials to the verification apparatus, or to transmit specific trust credentials (e.g. a summary calibration certificate/detailed authenticity certificate etc.).

At Step 307, all agent devices receiving the broadcast may transmit one or more of the trust credentials stored thereon to the verification apparatus as requested (e.g. via BLE) whereby, at Step 308 the trust credentials are received at the verification apparatus. Such trust credentials may comprise the summary and/or detailed calibration certificates, authenticity certificates, inspection certificates, maintenance certificates etc.

As above, the agent devices may, before transmission, sign the trust credentials using an associated private key.

At step 309, the inspector may, using the verification apparatus, undertake a challenge-response procedure with the agent devices to confirm the identity thereof, for example, by transmitting a cryptographic nonce to the agent devices from which it received the trust credentials. At step 310 the agent devices may sign the cryptographic nonce using the respective private keys of the agent devices.

At step 311, the agent devices may transmit the signed cryptographic nonces to the verification apparatus, whereby the verification apparatus may confirm the identity of the respective agent devices from which it received a signed cryptographic nonce using corresponding public keys provisioned thereon. As above, the public keys may be provisioned on the verification apparatus during a registration procedure with a cloud service or with the agent devices.

At step 312, the inspector may, using the verification apparatus, verify the trust credentials and the signature used to sign the cryptographic nonce, to determine whether the agent devices can be trusted. If the verification apparatus identifies any invalid trust credentials (e.g. no trusted root authority) or if the challenge-response procedure does not confirm the identity of the agent device, the inspector may take any appropriate action for a particular agent device e.g. inform the owner of the agent devices that trust could not be established, instruct a technician to undertake calibration, report any illegitimate devices to an appropriate authority, generate an inspection status certificate listing the reasons trust could not be established with the agent device.

Therefore, it will be appreciated that the present techniques provide a method for providing trust credentials on agent devices in a secure and efficient manner, whereby the trust credentials can be readily checked by a verifying party. It will also be appreciated that using trust credentials enables the verifying party to readily confirm that a required operation (e.g. calibration/maintenance/inspection) has been performed on an agent device by a party, and to confirm the identity of the party and details of the operation (e.g. time date).

Such functionality may reduce the number of physical labels that may have to be applied to agent devices in order to demonstrate trust to a verifying party, and may also reduce the paper-trail required to record information relating to the agent devices. Such functionality may also enable verifying parties to readily confirm the identity of agent devices, thereby establishing trust.

Such functionality may also be applicable to any number of agent devices, and therefore, scalability and security of the agent devices may be improved, as it may not be necessary for a party to physically connect with each agent device when generating or verifying trust credentials, as the trust credentials may be communicated thereto remotely.

Furthermore, trust credentials may be readily generated and transmitted to agent devices, such that updates to the trust credentials on a device may be undertaken at any time.

FIG. 5 schematically shows an example of an agent device 4 in communication with an application apparatus 160.

In the present example, the agent device 4 pushes operational data generated thereon to the application apparatus 160, whereby the application apparatus 160 may process the operational data e.g. using an application running thereon.

If the application apparatus 160 does not trust an agent device from which it is receiving operational data, the application apparatus may undertake a verification procedure to determine whether or not the agent device can be trusted e.g. by requesting trust credentials from the agent device as described above.

Furthermore, the agent device may also demonstrate that the operational data which it generates may be trusted (e.g. that it was not modified since it was generated by the agent device).

In an illustrative example, to demonstrate that the operational data generated thereon may be trusted, the agent device 4 may modify operational data generated thereon using an algorithm and sign the modified operational data with the private key of the agent device $Prk_{(Agent)}$. In the present example, the algorithm used to modify the operational data comprises a checksum algorithm such as a secure checksum e.g. SHA256 or HMAC (Hash-based message authentication code), resulting in a checksum of the operational data.

The agent device 4 may then transmit the unmodified operational data and signed checksum to the application apparatus 160.

In order to determine whether or not the operational data can be trusted e.g. to confirm that it was not modified since being generated by the agent device 4, the application apparatus 160 may request the public key $Puk_{(Agent)}$ which corresponds to the private key $Prk_{(Agent)}$ used to sign the checksum if it is not provisioned thereon.

The application apparatus 160 may, using the public key $Puk_{(Agent)}$, verify the signature used to sign the checksum of the operational data. The application apparatus may then modify the unmodified operational data received from agent device 4 using the same algorithm used by the agent device 4 to provide a checksum, and then compare the checksum with the signed checksum received from the agent device 4. If the checksums correspond to each other (e.g. if they are identical), then the application apparatus 160 may determine that the operational data was not modified since it was signed by the agent device 4.

Such functionality provides protection from a man-in-the-middle attack and may provide a level of trust that the agent device 4 is not compromised e.g. by malware or a rogue $3^{rd}$ party.

Furthermore, in order to verify that the agent device 4 has access to the private key $Prk_{(Agent)}$ used to sign the checksum and/or a trust credential, and therefore, confirm the identity of the agent device 4, the application apparatus may undertake a challenge-response procedure with the agent device as described above.

Using such functionality, the application apparatus 160, may receive operational data from a plurality of agent devices, and establish trust with each agent device and further confirm the identity of each agent device, and therefore, trust the operational data received from each agent device, whereby such operational data may be used as part of a big data application.

Whilst the examples above generally describe peer-to-peer functionality, whereby the trust credentials may be stored locally on the agent device 4 and transmitted to/from application apparatuses 102/150/160 in communication therewith e.g. via BLE, it may also be possible for application apparatuses to transmit the trust credentials associated with the agent device to a cloud based resource 120 for storage thereat, and/or to obtain the trust credentials and/or the operational data from the cloud based resource 120.

In an illustrative example, FIG. 6 schematically shows an example of a system 200 comprising a cloud based resource 120 for receiving trust credentials from application apparatuses and/or transmitting such trust credentials to the application apparatuses. Like numbering will be used to describe like features described above.

In the present example, the remote resource 120 is a registry apparatus which is configured to maintain a trusted device registry which stores information relating to devices and apparatuses. The registry apparatus 120 may be configured to communicate with application apparatuses including the test apparatus 102 and verification apparatuses 150 e.g. over the internet using any suitable protocol.

In the present example, after a calibration or maintenance procedure, the technician may, using test apparatus 102, generate a trust credential such as calibration certificate 124 comprising device data and/or authentication information as described above, whereby the calibration certificate 124 is transmitted to the registry apparatus 120 and stored thereat. It will be appreciated that the registry apparatus 120 may only accept trust credentials from a trusted party e.g. the technician, whereby the technician may undertake a registration procedure with the registry apparatus. For example the registry apparatus may check trust credentials (e.g. certificates) associated with the technician (e.g. via test apparatus). Furthermore, in some examples, the access (e.g. write/read privileges) granted to a particular technician by a registry apparatus may be dependent on trust credentials associated with the technician.

As the trusted party may provide trust credentials associated with an agent device directly to the registry apparatus e.g. via a test apparatus, the agent device 4 is not required to upload trust credentials to the registry apparatus 120, and therefore, may conserve power. Furthermore, the registry apparatus 120 may comprise the most recent trust credentials for an agent device, and may also store historic trust credentials as necessary. Therefore, historic trust credentials can be overwritten/deleted from the memory circuitry of the agent device. Such functionality may allow for reduced memory requirements for agent devices, in comparison to examples wherein historic trust credentials are stored on the agent device.

The location of the registry apparatus 120 may be represented by any suitable location identifier such as for example a universal resource locator (URL), IPv6 address or IPv4 and the test apparatus 102 may be provisioned with the location identifier of the registry apparatus 120 which is stored in memory thereon such that the test apparatus can communicate therewith e.g. the location identifier may be provisioned thereon during a registration procedure with the registry apparatus.

Furthermore, the registry apparatus 120 may also comprise authenticity certificate 140 associated with agent device 4 which may be provided to the registry apparatus e.g. by the owner/manufacturer/vendor of the agent device during a registration process therewith. Furthermore, the registry apparatus 120 may further comprise other trust credentials such as inspection status certificates, maintenance certificates etc.

Therefore, as schematically shown in FIG. 6, an inspector may, using verification apparatus 150, verify the trust credentials associated with the agent device 4 e.g. the calibration certificate 124 and/or the authenticity certificate 140, and any associated device data/authentication information by communicating directly with the registry apparatus 120 and obtaining the trust credentials associated with the agent device 4 therefrom.

The inspector may be provisioned with the location identifier of the registry apparatus 120.

In further examples, the inspector may obtain the location identifier from the agent device, whereby, the inspector may, using the verification apparatus 150, broadcast a scanning communication comprising a request for agent devices to respond as described above, by transmitting any credential data thereon to the verification apparatus 150.

In the present example, the credential data comprises the location identifier of the registry apparatus 120 (e.g. the URL or IPv6 address). In some examples, the location identifier may also comprise a verifiable time dependent identifier e.g. generated at the test apparatus 102. It will be appreciated that the time dependent identifier can demonstrate the freshness of the location identifier e.g. when the location identifier was created/stored on the agent device etc.

It will be appreciated that the agent device is not limited to using time dependent identifiers to demonstrate the freshness of the location identifier to a party and any suitable means may be used e.g. a sequence number (e.g. a nonce), secret data.

The verification apparatus 150 may also undertake a challenge-response procedure with the agent device as described above, to verify that the agent device has access to the private key $Prk_{(Agent)}$.

On receiving and verifying the location identifier, the time dependent identifier and/or undertaking a challenge-response procedure with the agent device 4, the verification apparatus 150 may then communicate with the registry apparatus 120 to request the trust credentials associated with the agent device 4. The verification apparatus 150 may also verify its identity with the registry apparatus 120 using any suitable verification process e.g. by undertaking a challenge-response procedure.

On receiving the trust credentials from the registry 120, the verification apparatus 150 may analyse the trust credentials to determine whether the agent device can be trusted, and depending on the determination, establish trust between the verification apparatus and agent device.

Using such functionality, an agent device 4 may establish trust with an application apparatus by storing a location identifier of a remote resource at which associated trust credentials are stored. It will be appreciated that storing the location identifier may require less memory than storing trust credentials comprising authentication information/device data, and may require less bandwidth to transmit the location identifier of the remote resource in comparison to transmitting trust credentials.

Therefore, using a location identifier e.g. of a registry apparatus instead of one or more trust credentials may circumvent a bandwidth limitation on the agent device, speed up a scanning process and/or result in a reduction in the power used by an agent device. It will be appreciated that reducing the power used by the agent device may increase a battery lifetime of the agent device.

Furthermore, in further illustrative examples, the agent device may communicate directly with a remote resource (e.g. the registry apparatus) and may push operational data generated thereon to the remote resource, whereby the operational data may be requested directly from the remote resource by the verification apparatus. As such, the agent device may not be required to store operational data thereon, and so the memory requirements of the agent device may be reduced. In some examples, the agent device may be registered with a registry apparatus to which it is to push data e.g. via registration apparatus undertaken by an owner of the agent device. Furthermore, in some examples, the access (e.g. write/read privileges) granted to an agent device by a registry apparatus may be dependent on trust credentials (e.g. certificates) associated with the agent device and/or an owner thereof as verified by the registry apparatus.

Whilst the verification apparatuses described above generally comprise apparatuses controlled by a party interacting therewith, e.g. via a verification device in possession of an inspector, it will be appreciated that the verification process may be undertaken automatically using apparatuses/devices in communication with the agent devices e.g. devices/apparatuses in a network.

As an illustrative example, FIG. 7a shows a plurality of agent devices 4 provided within a mesh network 400 (e.g. Thread/ZigBee/BLE). The mesh network 400 comprises a plurality of nodes 402 (e.g. WiFi/BLE routers), which are arranged to communicate with each other within the mesh network 400.

In the present example, the nodes 402 communicate with an external network via a gateway 404 (e.g. an Internet Service Provider (ISP) router). In the present example, the external network is depicted as the internet, whereby the nodes 402 are in communication with a cloud service 406 thereon.

In the present example, the nodes 402 may communicate with agent devices 4 using any suitable communication protocol e.g. WiFi, BLE, ZigBee (as shown by the dashed lines). In the present example, the nodes 402 function as verification apparatuses as described above, whereby the nodes 402 may broadcast a scanning communication comprising a request for agent devices 4 to respond with any credential data provided thereon. Furthermore, the nodes 402 may verify operational data and/or undertake a challenge-response procedure with the agent devices 4 as described above.

The nodes 402 may be instructed to undertake a scan by a user via an application running on a data processing device 410 in communication therewith e.g. via the gateway 404. Alternatively, the nodes 402 may be instructed to undertake a scan by the cloud service 406 in communication therewith. In further examples the cloud service 406 may comprise a registry apparatus as described above.

Furthermore, whilst the verification apparatuses described above generally comprise apparatuses communicating with the agent devices 4 wirelessly, it will be appreciated that the verification process may be undertaken by verification apparatuses in communication with the agent devices 4 using wired communication or using a combination of wired/wireless communications.

As an illustrative example, FIG. 7b shows a plurality of agent devices 4 provided within a wired network 450, whereby the agent devices 4 are arranged to communicate with each other using a wired connection e.g. optical fibre/metal cable (e.g. Ethernet cable).

In the present example, the agent devices 4 are depicted as discrete agent devices 4 within a vehicle 451, such as a motor vehicle (e.g. a motorcar, motorcycle, train); watercraft (e.g. ships/boats) and/or aircraft (e.g. aeroplane/helicopter)), whereby for example, the agent devices 4 may be associated with different objects of the vehicle 451 (e.g. brakes, engine, wheels, exhaust system, flight data recorder, pitot tube; propellers etc.), and whereby each of the agent devices 4 may comprise credential data such as trust credentials relating to the different objects of the vehicle e.g. calibration/maintenance/authenticity certificates including device data and/or authentication information. Alternatively, the agent devices 4 may comprise credential data such as a location identifier of a registry apparatus on the cloud service 456, from which the trust credentials associated with the different agent devices may be obtained.

In the present example, the agent devices are depicted as being arranged in the vehicle 451 within a controller area network (CAN) bus 452, whereby the agent devices 4 may communicate with a verification apparatus 454, which may for example be a computer terminal (e.g. a test station).

For example, in the example of a motorcar, when a user brings the motorcar to a garage for servicing, a mechanic may connect the verification apparatus 454 to the agent devices 4 via the CAN-bus (e.g. via Ethernet).

As above, the verification apparatus 454 may then generate and transmit, via the CAN-bus, a scanning communication comprising a request for agent devices 4 to respond with the credential data provided thereon. Furthermore, the verification apparatus 454 may undertake a challenge-response procedure with the agent devices 4 as described above.

Using such functionality, it may be possible to verify all agent devices 4 using a single verification apparatus in communication with the agent devices. Therefore, for example, it may be possible for a verifying party e.g. a mechanic to verify the trust credentials on the verification apparatus to determine the status of the agent devices 4 and the associated objects. Furthermore, the verification apparatus 454 may also function as a test apparatus, whereby a mechanic may perform calibration/maintenance on an object, and update an agent device with a trust credential as previously described.

Those skilled in the art will appreciate that while the foregoing has described what is considered to be the best mode and where appropriate other modes of performing the embodiments, the embodiments should not be limited to the specific configurations and methods disclosed in this description. Those skilled in the art will recognise that the teachings have a broad range of applications, and that the embodiments may take a wide range of modifications.

In a first aspect there is provided a method of establishing trust between an agent device and a verification apparatus, the method comprising: obtaining, at the agent device, a trust credential, wherein the trust credential relates to an aspect of the agent device and may comprise authentication information for identifying at least one party trusted by the verification apparatus and/or device data relating to the agent device; transmitting, from the agent device to the verification apparatus, the trust credential; obtaining, at the verification apparatus, the trust credential; analysing, at the verification apparatus, the trust credential; determining, at the verification apparatus, whether the agent device is trusted based on the analysis; and responsive to determining the agent device is trusted, establishing trust between the agent device and the verification apparatus.

The method may further comprise: obtaining, at the agent device, operational data; and transmitting from the agent device to the verification apparatus, the operational data.

The method further comprise: transmitting, from the verification apparatus to the agent device, a request for the trust credential in response to receiving the operational data.

The method may further comprise: processing, at the verification apparatus, the operational data when the device is trusted.

The trust credential may comprise authentication information for identifying the agent device, wherein the trust credential may comprise a chain of trust between the agent device and the at least one trusted party, and wherein analysing the trust credential may comprise: identifying parties in the chain of trust, and wherein determining whether the agent device is trusted may comprise: identifying the at least one trusted party in the chain of trust.

The trust credential may comprise one or more of a calibration credential, a maintenance credential, an inspection credential and/or an authenticity credential.

The device data may comprise data relating to an operating parameter of the agent device, data relating to an operating state of the agent device and/or data relating to the precision of the agent device.

The authentication information may comprise a cryptographic key or a cryptographic signature generated using a cryptographic key.

The method may further comprise: initiating, at the verification apparatus, a challenge-response procedure between the verification apparatus and the agent device; and establishing trust based on the challenge-response procedure.

Transmitting the trust credential may comprise: transmitting the trust credential on receiving a request communication from the verification apparatus or broadcasting the data from the agent device without receiving a request communication from the verification apparatus.

The trust credential may comprise one more digital certificates.

In another aspect there is provided a method of establishing trust between an agent device and a verification apparatus, the method comprising: obtaining, at the agent device, credential data, wherein the credential data may comprise a location identifier of a remote resource; transmitting, from the agent device to the verification apparatus, the location identifier; obtaining, at the verification apparatus, the location identifier; transmitting, from the verification apparatus to the remote resource, a request for a trust credential, wherein the trust credential relates to an aspect of the agent device and may comprise authentication information for identifying at least one party trusted by the verification apparatus and/or device data relating to the agent device; receiving, at the verification apparatus from the remote resource, the trust credential; analysing, at the verification apparatus, the trust credential; determining, at the verification apparatus, whether the agent device is trusted based on the analysis; and responsive to determining the agent device is trusted, establishing trust between the agent device and the verification apparatus.

The method may further comprise: transmitting, from the verification apparatus to the remote resource, a request for the trust credential associated with the agent device, wherein the credential data may further comprise a time dependent identifier.

In a further aspect there is provided a method of demonstrating trust to a verification apparatus by an agent device, the method comprising: obtaining, at the agent device, credential data, wherein the credential data may comprise a trust credential which relates to an aspect of the agent device and may comprise authentication information for identifying at least one party trusted by the verification apparatus and/or device data relating to the agent device, or wherein the credential data may comprise a location identifier of a remote resource having access to a trust credential associated with the agent device; storing, at the agent device, the credential data; transmitting, from the agent device to the verification apparatus, the credential data.

The method may further comprise: obtaining, at the agent device, operational data; and transmitting from the agent device to the verification apparatus, the operational data.

The method may further comprise: receiving, at the agent device from the verification apparatus, a request to transmit the credential data; and transmitting, from the agent device to the verification apparatus, the credential data in response to the request.

The method may further comprise: receiving, at the agent device from the verification apparatus, a challenge communication as part of a challenge-response procedure; transmitting, from the agent device to the verification apparatus, a response communication as part of the challenge-response procedure, wherein the response communication may comprise authentication information identifying the agent device and/or a time dependent identifier.

The trust credential may comprise a calibration credential, a maintenance credential, an inspection credential and/or an authenticity credential.

In a further aspect there is provided a data processing device comprising: processing circuitry, storage circuitry and communications circuitry, wherein the data processing device is configured perform the methods of any of the aspects above.

In a further aspect there is provided a method of determining, at a verification apparatus, whether an agent device is trusted by the verification apparatus, the method comprising: receiving, at the verification apparatus, a trust credential, wherein the trust credential relates to an aspect of the agent device and may comprise authentication information for identifying the agent device and a root authority in a chain of trust and wherein the trust credential may further comprise device data relating to the agent device; analysing, at the verification apparatus, the trust credential; determining based on the analysis whether the agent device is trusted, wherein determining whether the agent device is trusted may comprise: identifying at least one party trusted by the verification apparatus in the chain of trust.

The method may further comprise: receiving, at the verification apparatus, operational data generated at the agent device.

The method may further comprise: processing, on the verification apparatus when the agent device is trusted, the operational data.

The method may further comprise: transmitting, from the verification apparatus to the agent device, a challenge communication as part of a challenge-response procedure; receiving, at the verification apparatus from the agent device, a response communication as part of the challenge-response procedure, wherein the response communication may comprise authentication information identifying the agent device, wherein receiving the trust credential may comprise: receiving the trust credential from the agent device; or receiving the trust credential from a remote resource.

The trust credential may comprise one or more of a calibration credential, a maintenance credential, an inspection credential and/or an authenticity credential.

The device data may comprise data relating to an operating parameter of the agent device, data relating to an operating state of the agent device and/or data relating to the precision of the agent device.

The authentication information may comprise a cryptographic key or a cryptographic signature generated using a cryptographic key.

In a further aspect there is provided, a method of generating a credential on an application apparatus for establishing trust between an agent device and a verification apparatus, the method comprising: obtaining, at the application apparatus, authentication information identifying the agent device and at least one party trusted by the verification apparatus; generating, at the application apparatus, a trust credential, wherein the trust credential relates to an aspect of the agent device and may comprise the authentication information and/or device data relating to the agent device; transmitting, from the application providing apparatus to the agent device and/or a remote resource, the trust credential, wherein the trust credential may comprise one or more of a calibration credential, a maintenance credential, an inspection credential and/or an authenticity credential.

The device data may comprise data relating to an operating parameter of the agent device, data relating to an operating state of the agent device and/or data relating to the precision of the agent device.

The authentication information may comprise a cryptographic key or a cryptographic signature generated using a cryptographic key.

The invention claimed is:

1. A method of establishing trust between an agent device and a verification apparatus, the method comprising:
obtaining, at the agent device:
a summary digital trust credential comprising one or more digital certificates to demonstrate a
first status of the agent device, where the summary digital trust credential comprises:
agent device data relating to the agent device to support the first status, authentication information including a cryptographic key or a cryptographic signature generated using a cryptographic key for identifying the agent device, at least one trusted party trusted by the verification apparatus, and a chain of trust between the agent device and the at least one trusted party;
a detailed digital trust credential to demonstrate the first status of the agent device, where the detailed digital trust credential comprises additional agent device data to support the first status;
transmitting, from the agent device to the verification apparatus, the summary digital trust credential, the detailed digital trust credential, and operational data generated by the agent device;
analysing, at the verification apparatus, the summary digital trust credential and determining whether the first status of the agent device is trusted based on the agent device data;
responsive to the verification apparatus being unable to establish that the first status is trusted based on the analysis of the summary digital trust credential, analysing, at the verification apparatus, the detailed digital trust credential and determining, at the verification apparatus, whether the first status of the agent device is trusted based on the additional agent device data; and
processing, at the verification apparatus, the operational data responsive to determining that the first status is trusted based on the analysis of the summary digital trust credential or the detailed digital trust credential.

2. The method according to claim 1, the method further comprising:
transmitting, from the verification apparatus to the agent device, a request for the summary trust credential in response to receiving the operational data.

3. The method according to claim 1, wherein analyzing the summary trust credential comprises: identifying parties in the chain of trust.

4. The method according to claim 3, wherein determining whether the agent device is trusted comprises: identifying the at least one trusted party in the chain of trust.

5. The method according to claim 1, wherein the first status comprises one of a calibration status, a maintenance status and an inspection status.

6. The method according to claim 1, wherein the agent device data comprises data relating to an operating parameter of the agent device, data relating to an operating state of the agent device and/or data relating to the precision of the agent device.

7. The method according to claim 1, the method further comprising:
initiating, at the verification apparatus, a challenge-response procedure between the verification apparatus and the agent device; and establishing trust based on the challenge-response procedure.

8. The method according to claim 1, wherein transmitting the summary trust credential comprises transmitting the trust credential on receiving a request communication from the verification apparatus or wherein transmitting the summary trust credential comprises broadcasting the data from the agent device without receiving a request communication from the verification apparatus.

9. A method of establishing trust between an agent device and a verification apparatus, the method comprising:
obtaining, at the agent device, credential data, wherein the credential data comprises a location identifier of a remote resource and agent device data relating to the agent device to support the first status;
transmitting, from the agent device to the verification apparatus, the location identifier and operational data generated by the agent device;
obtaining, at the verification apparatus, the location identifier;
transmitting, from the verification apparatus to the remote resource, a request for a trust credential, wherein the trust credential is to demonstrate a first status of the agent device and comprises one or more digital certificates comprising: agent device data relating to the agent device to support the first status, authentication information including a cryptographic key or a cryptographic signature generated using a cryptographic key for identifying the agent device, at least one trusted party trusted by the verification apparatus, and a chain of trust between the agent device and the at least one trusted party;
receiving, at the verification apparatus from the remote resource, the trust credential;
analysing, at the verification apparatus, the trust credential;
determining, at the verification apparatus, whether the first status of the agent device is trusted based on the analysis; and
processing, at the verification apparatus, the operational data responsive to determining that the first status is trusted based on the analysis.

10. The method according to claim 9, wherein the credential data further comprises a time dependent identifier.

11. A method of demonstrating trust to a verification apparatus by an agent device, the method comprising:
obtaining, at the agent device, credential data, wherein the credential data comprises a summary digital trust credential comprising one or more digital certificates, to demonstrate a first status of the agent device and where the summary digital trust credential further comprises: agent device data relating to the agent device to support the first status, authentication information including a cryptographic key or a cryptographic signature generated using a cryptographic key for identifying the agent device, at least one trusted party trusted by the verification apparatus, and a chain of trust between the agent device and the at least one trusted party; and
where the credential data further comprises a detailed digital trust credential to demonstrate the first status and where the detailed digital trust credential comprises additional agent device data relating to the agent device to support the first status;
storing, at the agent device, the credential data;
transmitting, from the agent device to the verification apparatus, the credential data and operational data generated at the agent device for processing at the verification apparatus when the first status is trusted.

12. The method according to claim 11, the method further comprising:
receiving, at the agent device from the verification apparatus, a request to transmit the credential data; and
transmitting, from the agent device to the verification apparatus, the credential data in response to the request.

13. The method according to claim 11, the method further comprising:
receiving, at the agent device from the verification apparatus, a challenge communication as part of a challenge-response procedure;
transmitting, from the agent device to the verification apparatus, a response communication as part of the challenge-response procedure, wherein the response communication comprises authentication information identifying the agent device and/or a time dependent identifier.

14. The method according to claim 11, wherein the summary trust credential comprises a calibration credential, a maintenance credential, an inspection credential and/or an authenticity credential.

* * * * *